US010325748B2

(12) United States Patent
Kawarazaki et al.

(10) Patent No.: US 10,325,748 B2
(45) Date of Patent: Jun. 18, 2019

(54) ELECTRICAL CONNECTION BOX

(71) Applicant: Yazaki Corporation, Tokyo (JP)

(72) Inventors: Toshio Kawarazaki, Shizuoka (JP); Kazuki Iguchi, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 24 days.

(21) Appl. No.: 15/863,124

(22) Filed: Jan. 5, 2018

(65) Prior Publication Data

US 2018/0277328 A1    Sep. 27, 2018

(30) Foreign Application Priority Data

Mar. 22, 2017    (JP) ................. 2017-056048

(51) Int. Cl.
| | |
|---|---|
| *H01H 85/56* | (2006.01) |
| *H01M 2/34* | (2006.01) |
| *H01H 85/20* | (2006.01) |
| *H01H 85/143* | (2006.01) |
| *B60R 16/023* | (2006.01) |

(Continued)

(52) U.S. Cl.
CPC ......... *H01H 85/56* (2013.01); *B60R 16/0239* (2013.01); *H01H 85/143* (2013.01); *H01H 85/2015* (2013.01); *H01M 2/206* (2013.01); *H01M 2/348* (2013.01); *B60Y 2410/115* (2013.01); *H01H 2085/208* (2013.01); *H01M 2/307* (2013.01); *H01M 2200/103* (2013.01); *H01M 2220/20* (2013.01); *H02G 3/081* (2013.01)

(58) Field of Classification Search
CPC .. H01H 85/143; H01H 85/2015; H01H 85/56; H01H 2085/2075; H01H 2085/208; B60R 16/0239; B60Y 2410/115; H01M 2/206; H01M 2/307; H01M 2/348; H01M 2200/103; H01M 2220/20; H02G 3/081
USPC ........................................... 337/188
See application file for complete search history.

(56) References Cited

U.S. PATENT DOCUMENTS

| | | | | |
|---|---|---|---|---|
| 5,345,211 | A | * | 9/1994 | Muramatsu ........ H01H 85/2035 |
| | | | | 337/186 |
| 5,438,310 | A | * | 8/1995 | Ikari ...................... H01H 85/20 |
| | | | | 337/186 |

(Continued)

FOREIGN PATENT DOCUMENTS

JP    2012-244876 A    12/2012

*Primary Examiner* — Jacob R Crum
(74) *Attorney, Agent, or Firm* — Sughrue Mion, PLLC

(57) ABSTRACT

An electrical connection box includes a fusible link including a pair of terminal portions, a plate-shaped conductive member, a first nut including a first flange portion and fastened to the conductive member by being screwed with a first screw member, a second nut including a second flange portion and fastened to the conductive member by being screwed with a second screw member, and a block that includes a holding portion holding the first flange portion and the second flange portion and holds the fusible link. The holding portion extends between the pair of terminal portions in a projecting direction of the terminal portions, and includes a first holding portion located on a back side in an insertion direction, a second holding portion located on an entrance side in the insertion direction, and a projecting portion allowing entry of the first flange portion and restricting entry of the second flange portion.

10 Claims, 18 Drawing Sheets

(51) Int. Cl.
*H01M 2/20* (2006.01)
*H02G 3/08* (2006.01)
*H01M 2/30* (2006.01)

(56) References Cited

U.S. PATENT DOCUMENTS

| | | | | |
|---|---|---|---|---|
| 5,580,281 | A | * | 12/1996 | Takeuchi ........... H01H 85/2035 337/210 |
| 5,643,693 | A | * | 7/1997 | Hill ..................... H01M 2/1083 429/121 |
| 5,857,874 | A | * | 1/1999 | Takeuchi ................. H01H 9/10 439/620.26 |
| 2006/0021779 | A1 | * | 2/2006 | Kanazawa ............. H02G 3/088 174/67 |
| 2013/0120101 | A1 | * | 5/2013 | Taguchi ................. H01H 85/20 337/190 |

* cited by examiner

ELECTRICAL CONNECTION BOX

CROSS-REFERENCE TO RELATED APPLICATION(S)

The present application claims priority to and incorporates by reference the entire contents of Japanese Patent Application No. 2017-056048 filed in Japan on Mar. 22, 2017.

BACKGROUND OF THE INVENTION

1. Field of the Invention

The present invention relates to an electrical connection box.

2. Description of the Related Art

Conventionally, there are known techniques for connecting a terminal to a plate-shaped conductive member in an electrical connection box. Japanese Patent Application Laid-open No. 2012-244876 discloses a technique of a connection structure between a wire end terminal and an electric device that includes a terminal conversion block fastened and fixed to a box main body together with a conductive plate portion by a bolt and a nut. In the connection structure disclosed in Japanese Patent Application Laid-open No. 2012-244876, the terminal conversion block includes a conductive block busbar, which, in turn, includes, on one end side thereof, a busbar-side bolt insertion portion, and on the other end side thereof, a wire-side electric contact portion.

There is a case where terminals are fastened by nuts and screw members to conductive members connected to a fusible link. In such a case, the nuts are disposed in a limited space between a pair of terminal portions included in the fusible link. It is desired to allow the plurality of terminals to be fastened to the conductive members by effectively using the limited space.

SUMMARY OF THE INVENTION

It is an object of the present invention to provide an electrical connection box capable of fastening a plurality of terminals to conductive members by effectively using a limited space among the terminals.

In order to achieve the above mentioned object, an electrical connection box according to one aspect of the present invention includes a fusible link that includes a pair of terminal portions facing each other, a plate-shaped conductive member that is electrically connected to one of the terminal portions, a first nut that includes a first flange portion and that is fastened to the conductive member by being screwed with a first screw member, a second nut that includes a second flange portion and that is fastened to the conductive member by being screwed with a second screw member, and a block that includes a holding portion holding the first flange portion and the second flange portion and that holds the fusible link, wherein the holding portion extends between the pair of terminal portions in a direction in which the terminal portions project, the holding portion includes an insertion port into which the first flange portion and the second flange portion are inserted, a first holding portion that is located on a back side in the direction of the insertion and that holds the first flange portion, and a second holding portion that is located on an entrance side in the direction of the insertion and that holds the second flange portion, at least one of a thickness and a width of the second flange portion is larger than that of the first flange portion, and the holding portion includes a projecting portion that allows the first flange portion to enter the first holding portion, and that abuts on the second flange portion to restrict the second flange portion from entering the first holding portion.

According to another aspect of the present invention, in the electrical connection box, the thickness of the second flange portion may be larger than the thickness of the first flange portion, the projecting portion may project in the thickness direction of the first flange portion and the second flange portion, and may be provided in the first holding portion in the direction of the insertion, and the projecting portion may support the first flange portion from a side opposite to the conductive member in the thickness direction.

According to still another aspect of the present invention, in the electrical connection box, the width of the second flange portion may be larger than the width of the first flange portion, the projecting portion may project in the width direction of the first flange portion and the second flange portion, and may be provided in the first holding portion in the direction of the insertion, and the projecting portion may pinch the first flange portion in the width direction to hold the first flange portion.

According to still another aspect of the present invention, in the electrical connection box, the conductive member may include a first fixing portion to which the first nut is fastened, and a second fixing portion that is parallel to the first fixing portion and to which the second nut is fastened, and the conductive member may have a curved portion between the first fixing portion and the second fixing portion.

According to still another aspect of the present invention, in the electrical connection box, the block may include an electric wire holding portion configured to hold an electric wire led out from an electronic component held by the block, and the electric wire holding portion may include a restricting portion that is located between a terminal fastened to the conductive member and the electric wire, and that restricts the terminal from rotating toward the electric wire.

DETAILED DESCRIPTION OF THE PREFERRED EMBODIMENTS

The following describes in detail an electrical connection box according to embodiments of the present invention, with reference to the drawings. The embodiments do not limit the present invention. Components in the following embodiments include those easily conceivable by those skilled in the art, or those substantially identical thereto.

First Embodiment

Figure 1:
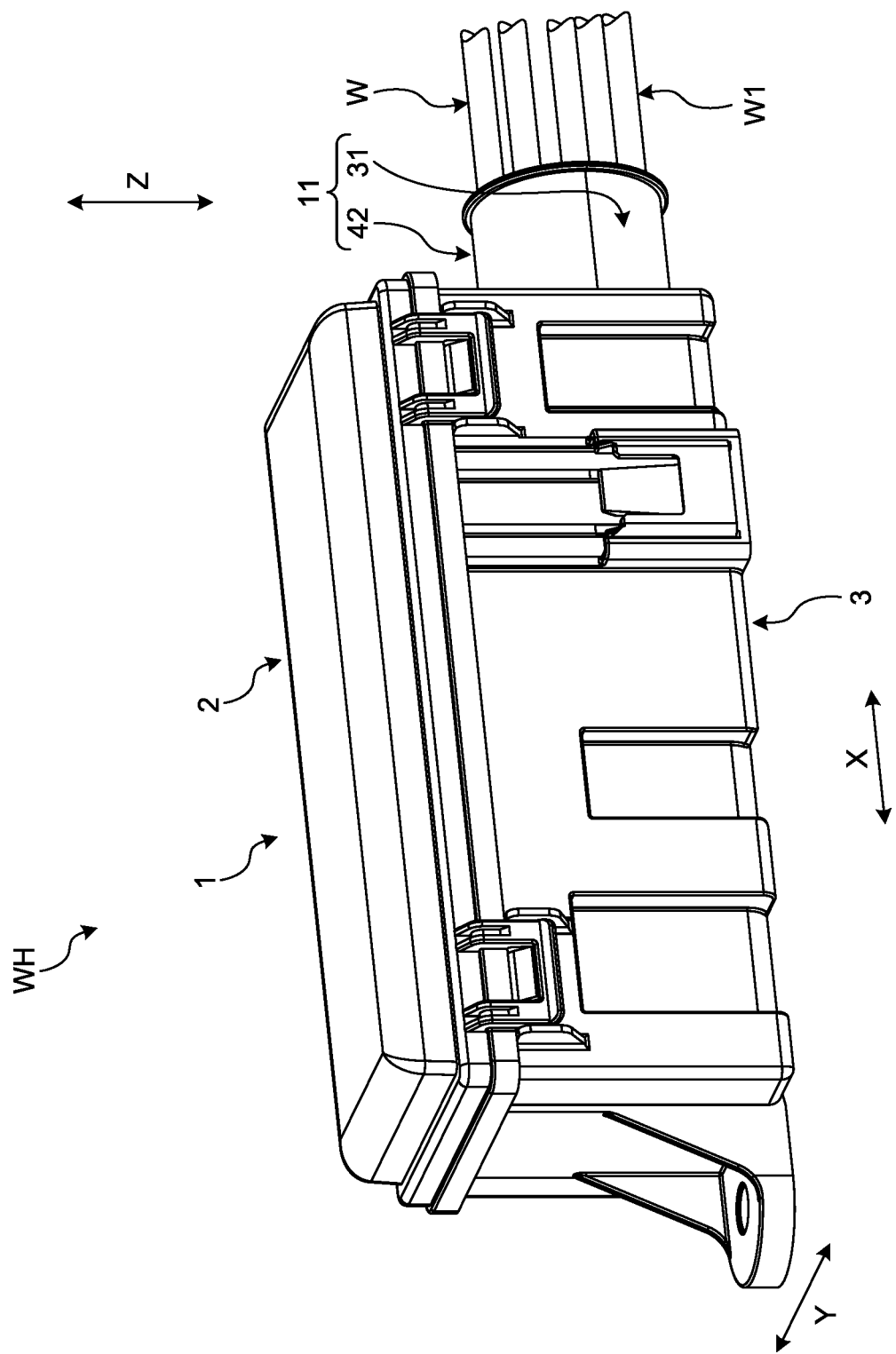
FIG. 1 is a perspective view of an electrical connection box and a wire harness according to a first embodiment of the present invention.
Figure 2:
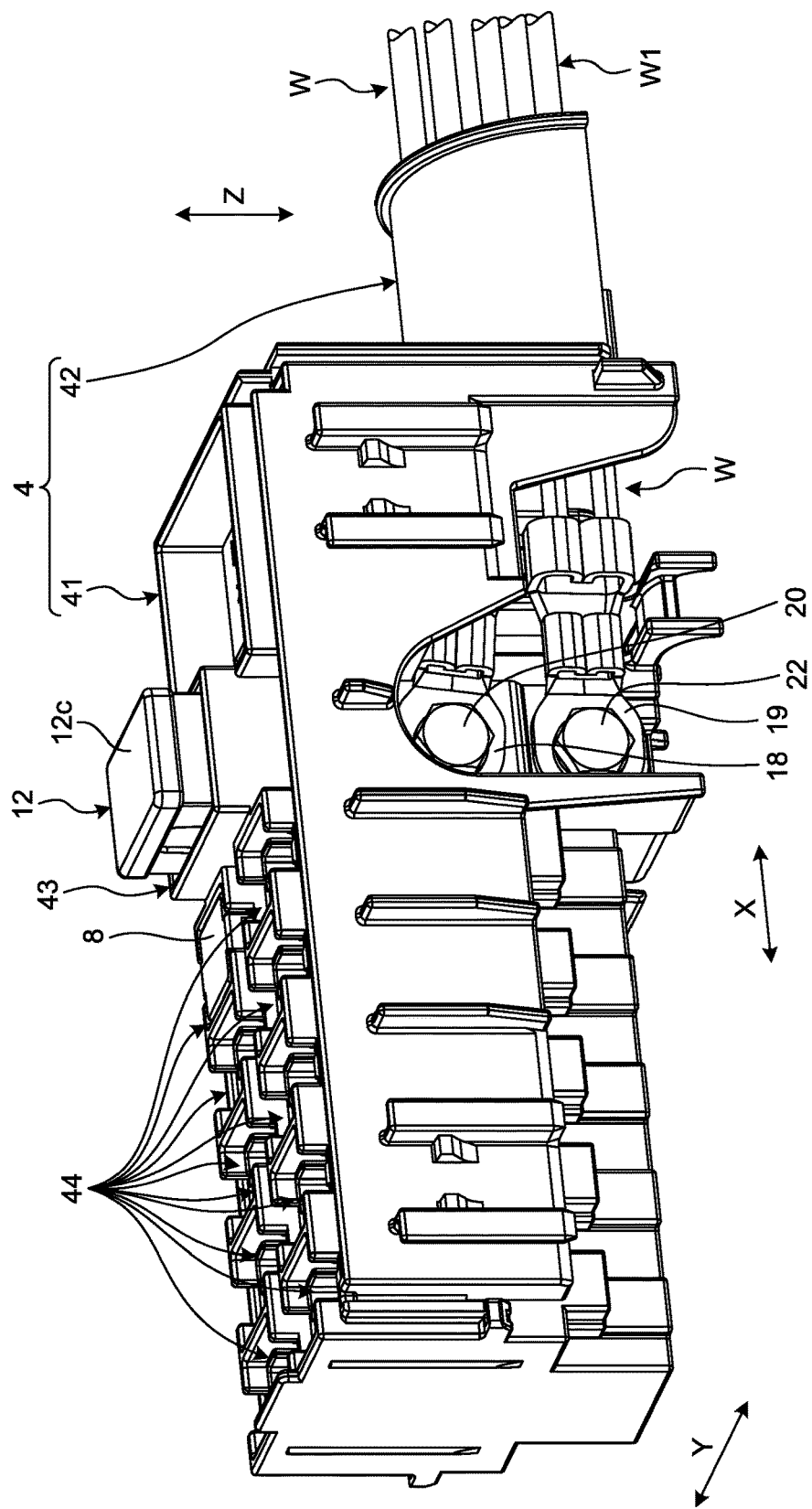
FIG. 2 is a perspective view illustrating the inside of the electrical connection box according to the first embodiment.
Figure 3:
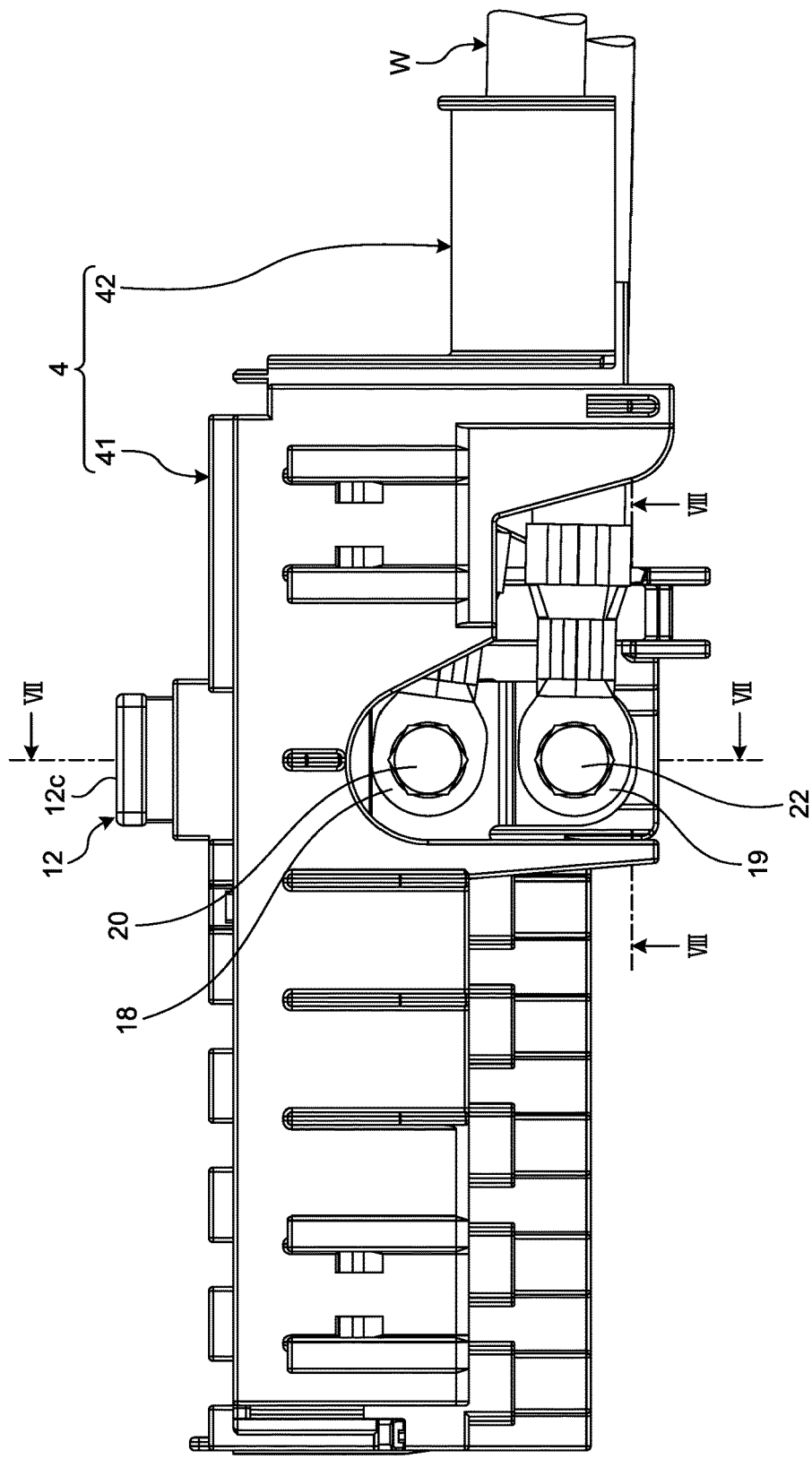
FIG. 3 is a side view illustrating the inside of the electrical connection box according to the first embodiment.
Figure 4:
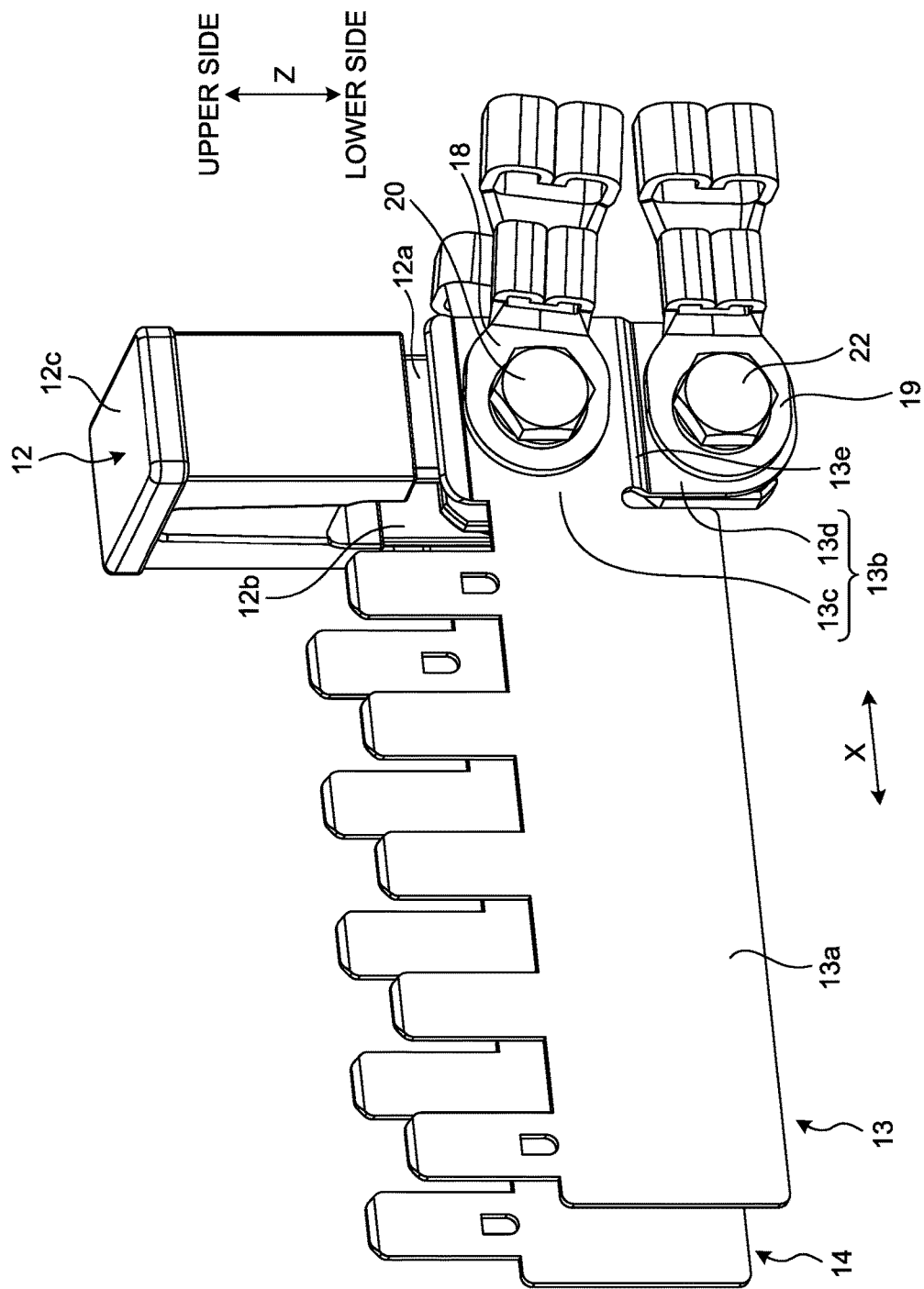
FIG. 4 is a perspective view of an electrical connection structure in the electrical connection box according to the first embodiment.
Figure 5:
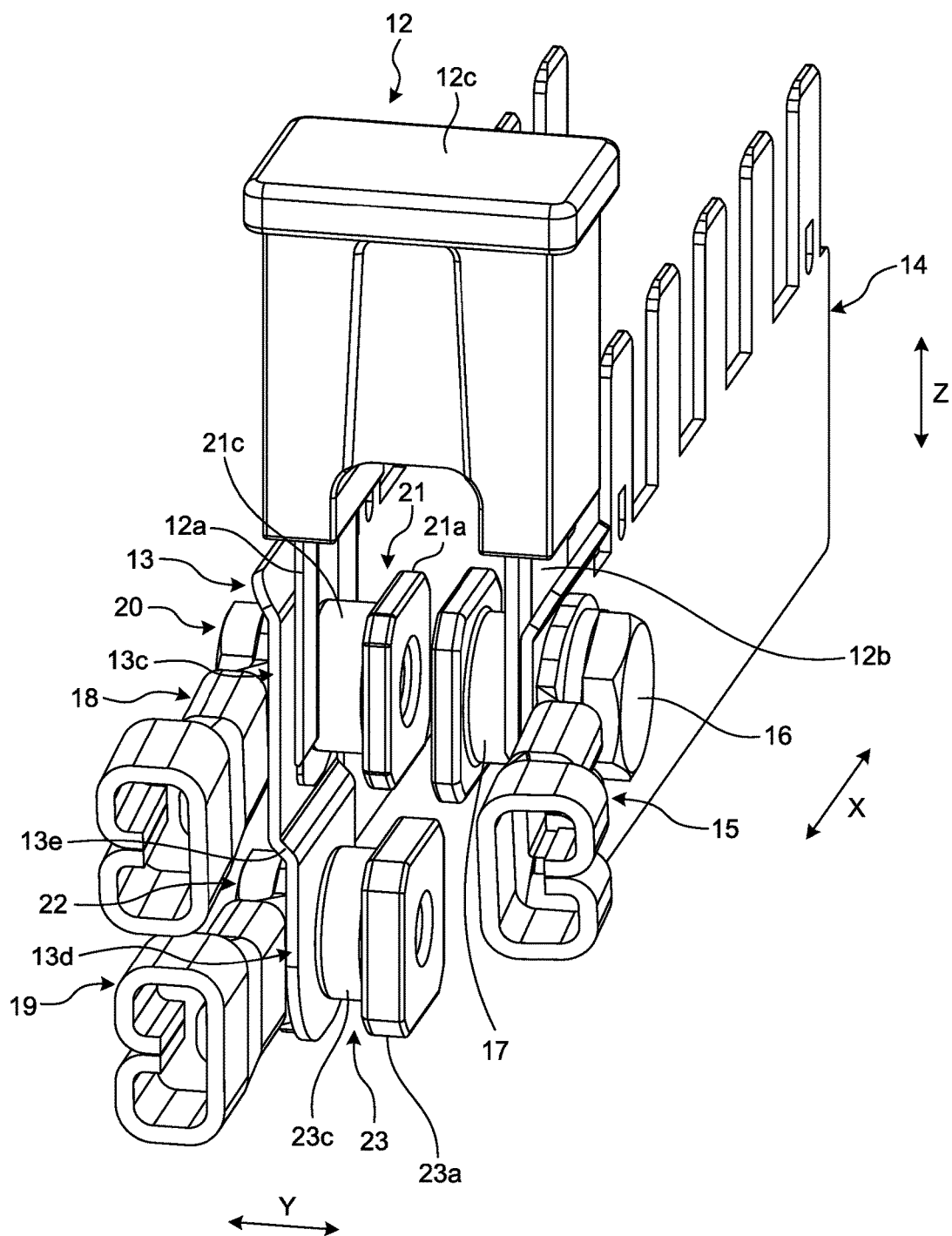
FIG. 5 is another perspective view of the electrical connection structure in the electrical connection box according to the first embodiment.
Figure 6:
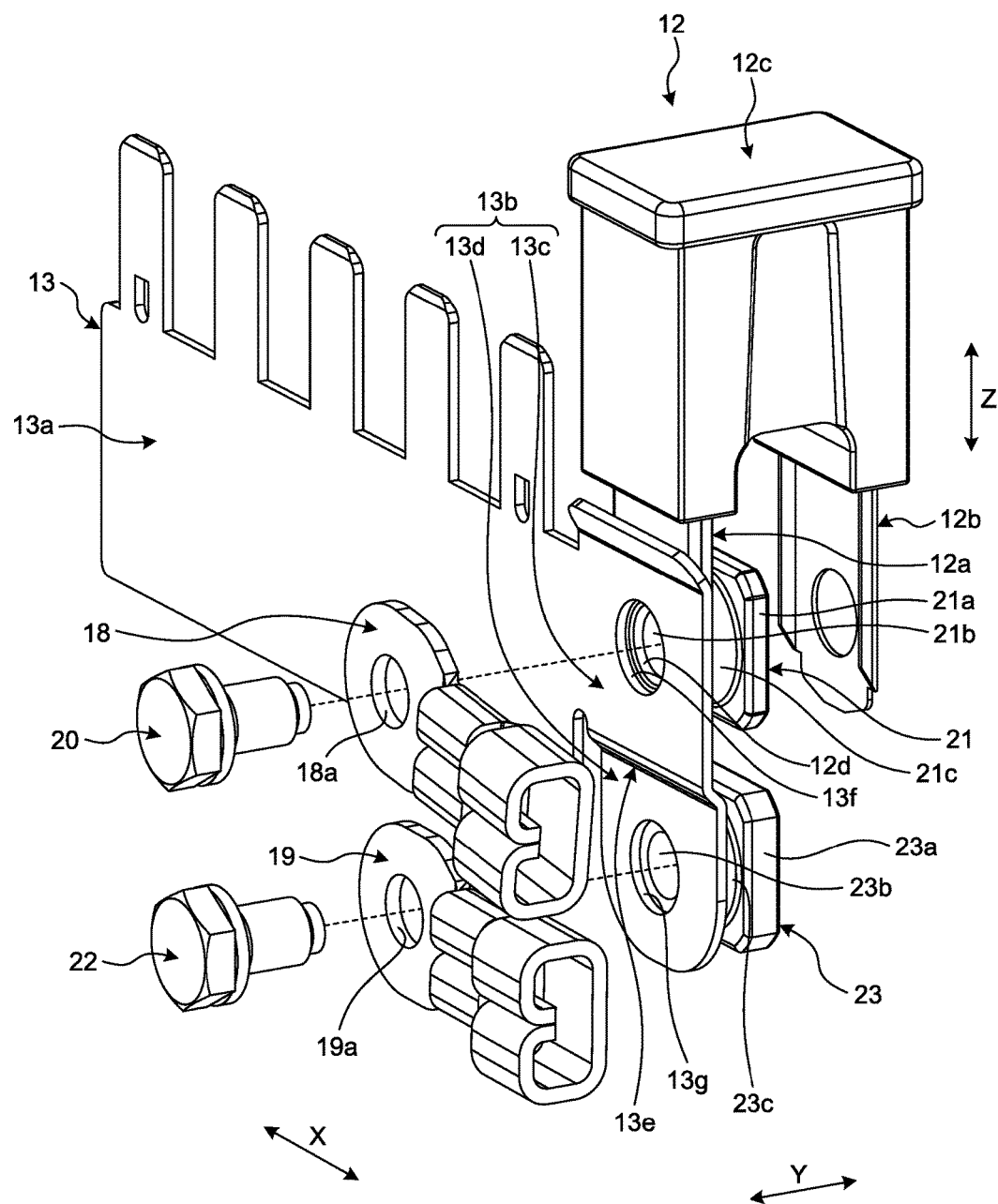
FIG. 6 is an exploded perspective view of a fastening structure in the electrical connection box of the first embodiment.
Figure 7:
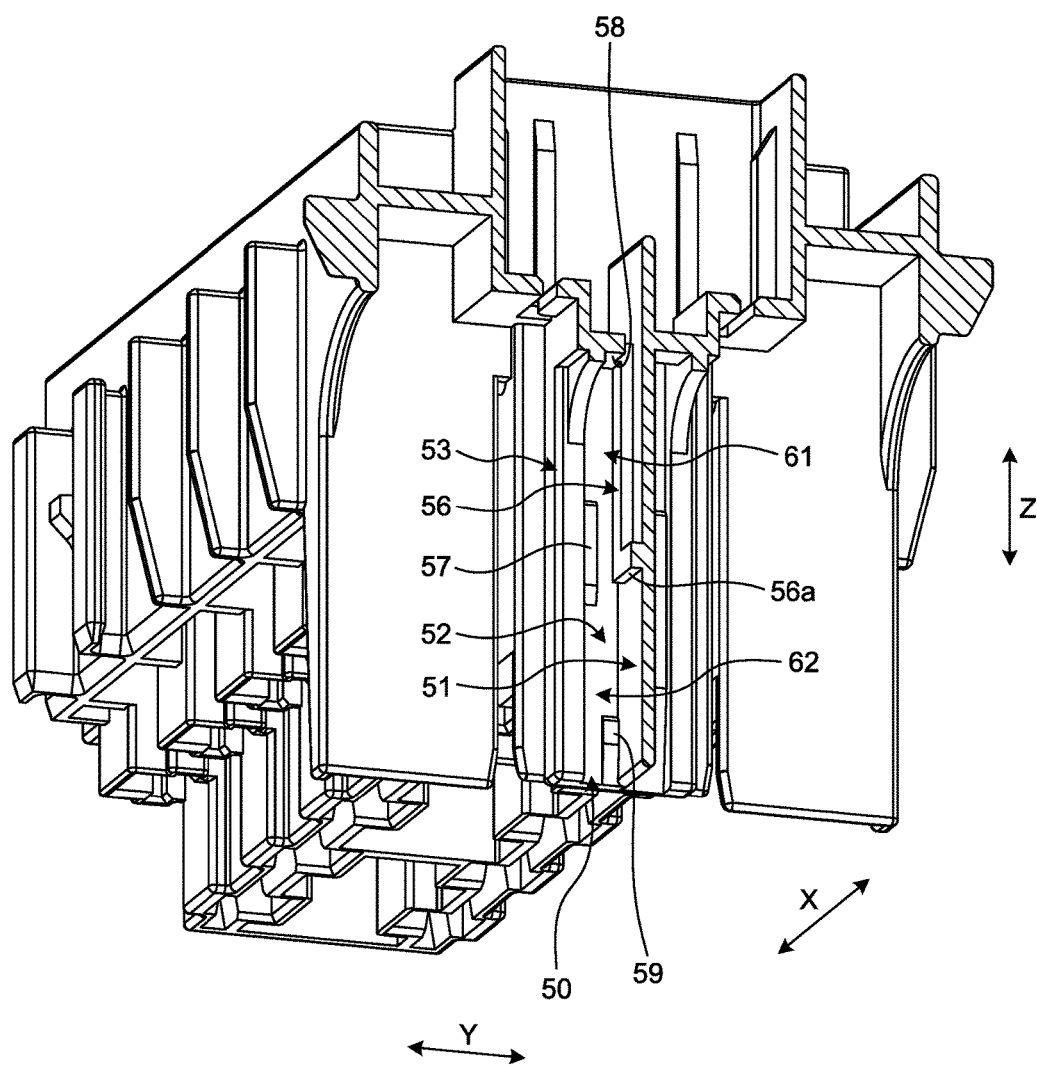
FIG. 7 is a sectional perspective view of a block according to the first embodiment.
Figure 8:
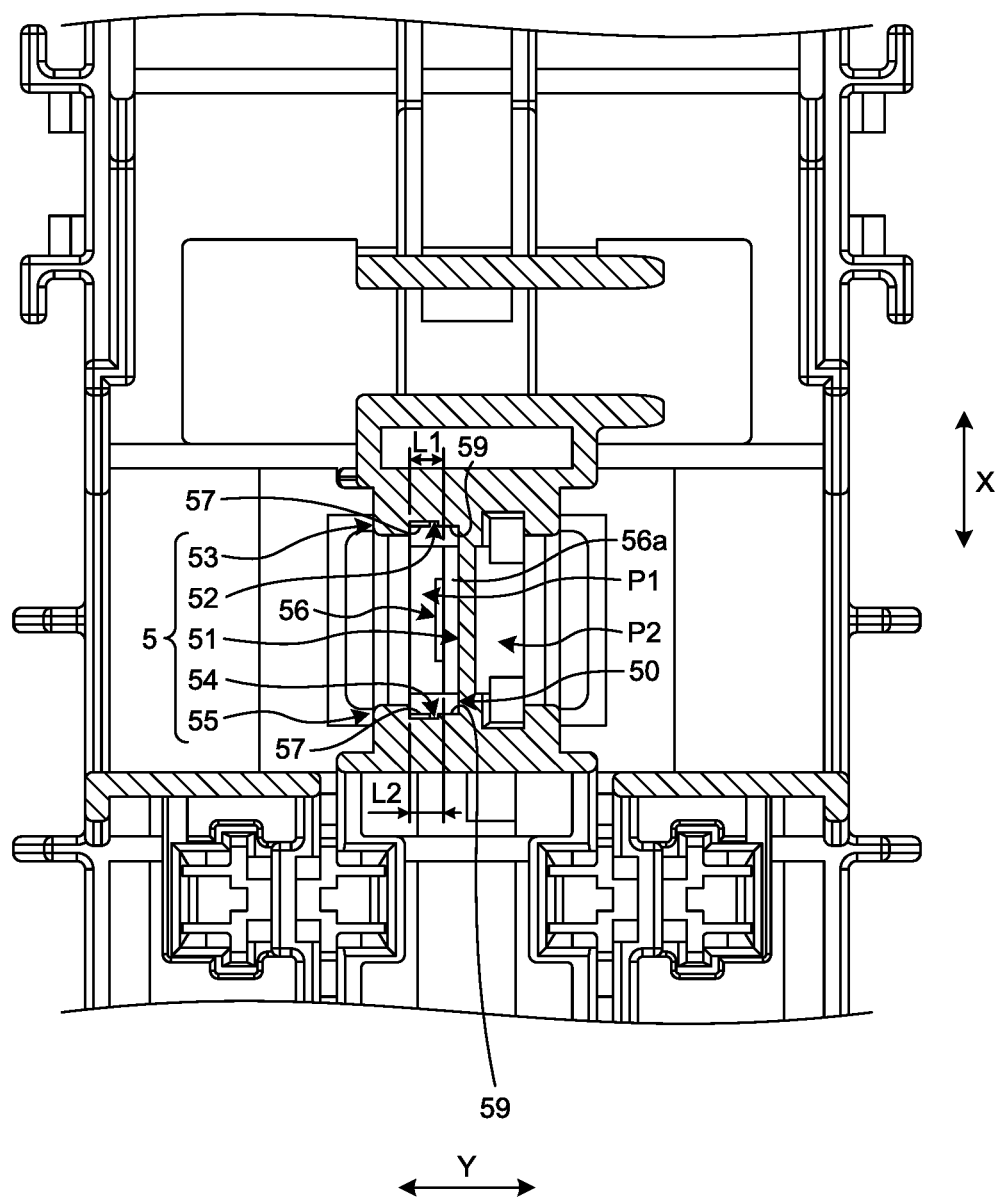
FIG. 8 is a sectional view of the block according to the first embodiment.
Figure 9:
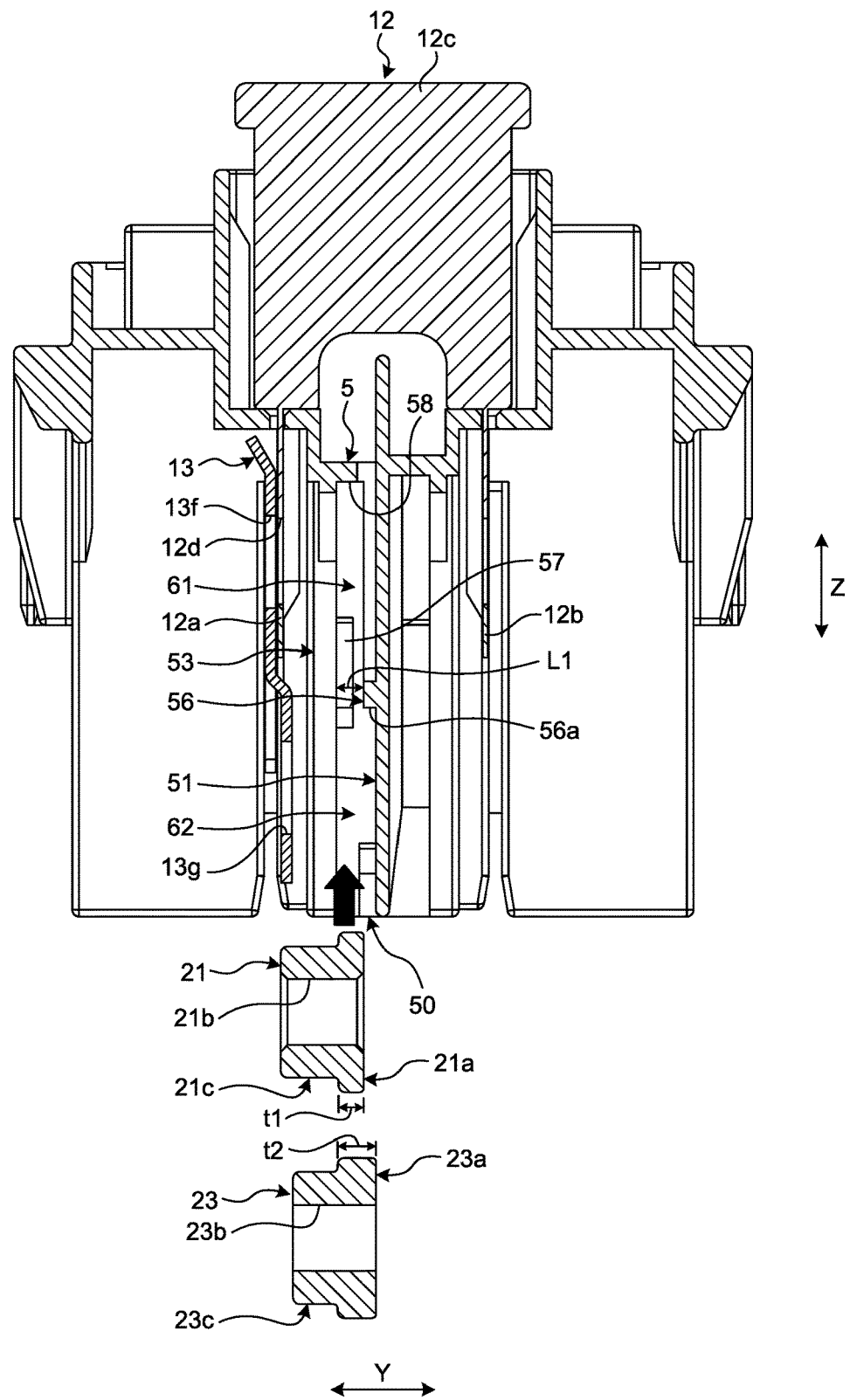
FIG. 9 is a sectional view for explaining insertion of nuts in the first embodiment.
Figure 10:
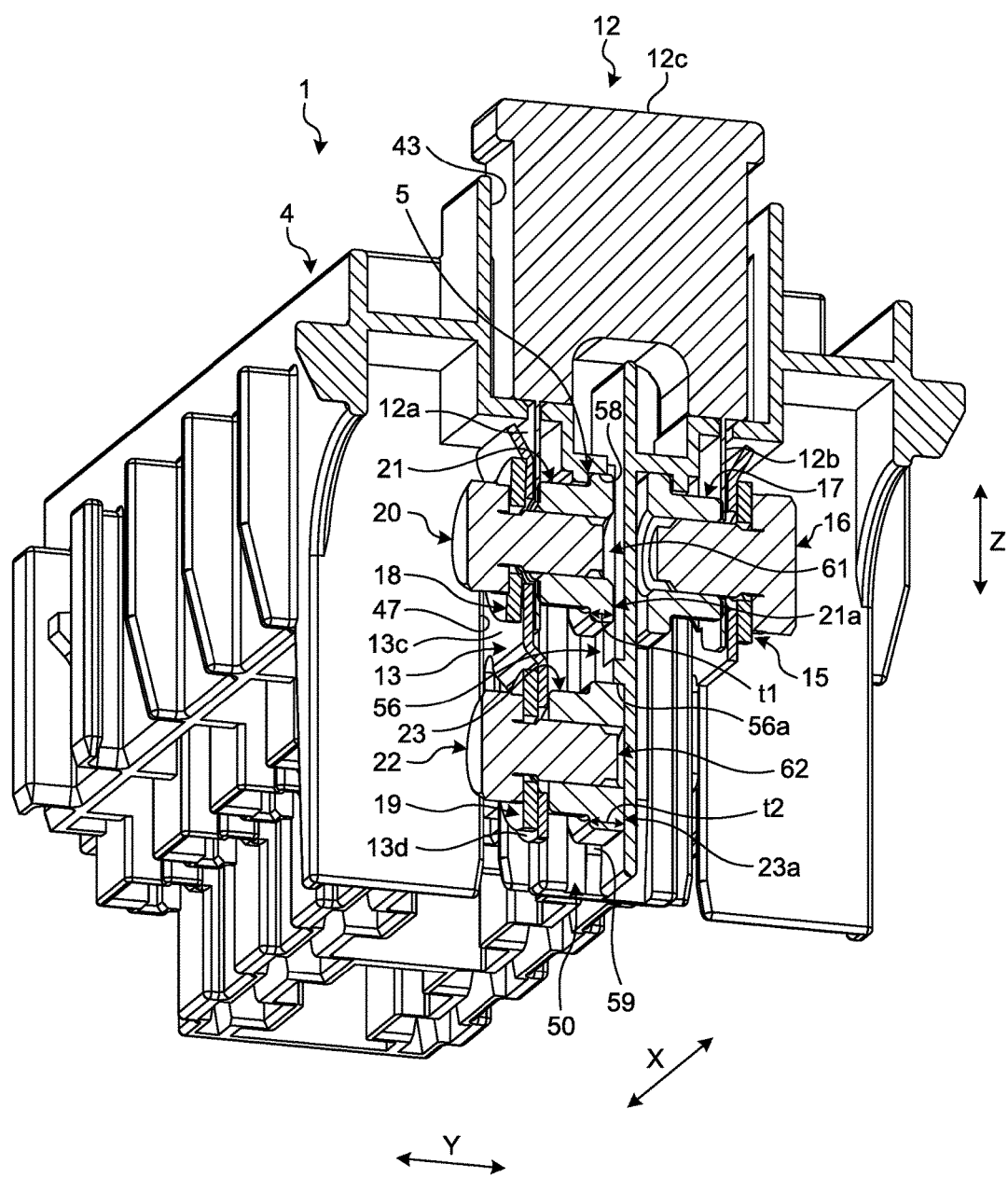
FIG. 10 is a sectional view of a state where the nuts and respective screw members have been screwed together in the first embodiment.

A first embodiment of the present invention will be described with reference to FIGS. 1 to 14. The first embodiment relates to the electrical connection box. FIG. 1 is a perspective view of the electrical connection box and a wire harness according to the first embodiment. FIG. 2 is a perspective view illustrating the inside of the electrical connection box according to the first embodiment. FIG. 3 is a side view illustrating the inside of the electrical connection box according to the first embodiment. FIG. 4 is a perspective view of an electrical connection structure in the electrical connection box according to the first embodiment. FIG. 5 is another perspective view of the electrical connection structure in the electrical connection box according to the first embodiment. FIG. 6 is an exploded perspective view of a fastening structure in the electrical connection box of the first embodiment. FIG. 7 is a sectional perspective view of a block according to the first embodiment. FIG. 8 is a sectional view of the block according to the first embodiment. FIG. 9 is a sectional view for explaining insertion of nuts in the first embodiment. FIG. 10 is a sectional view of a state where the nuts and respective screw members have been screwed together in the first embodiment.

Figure 11:
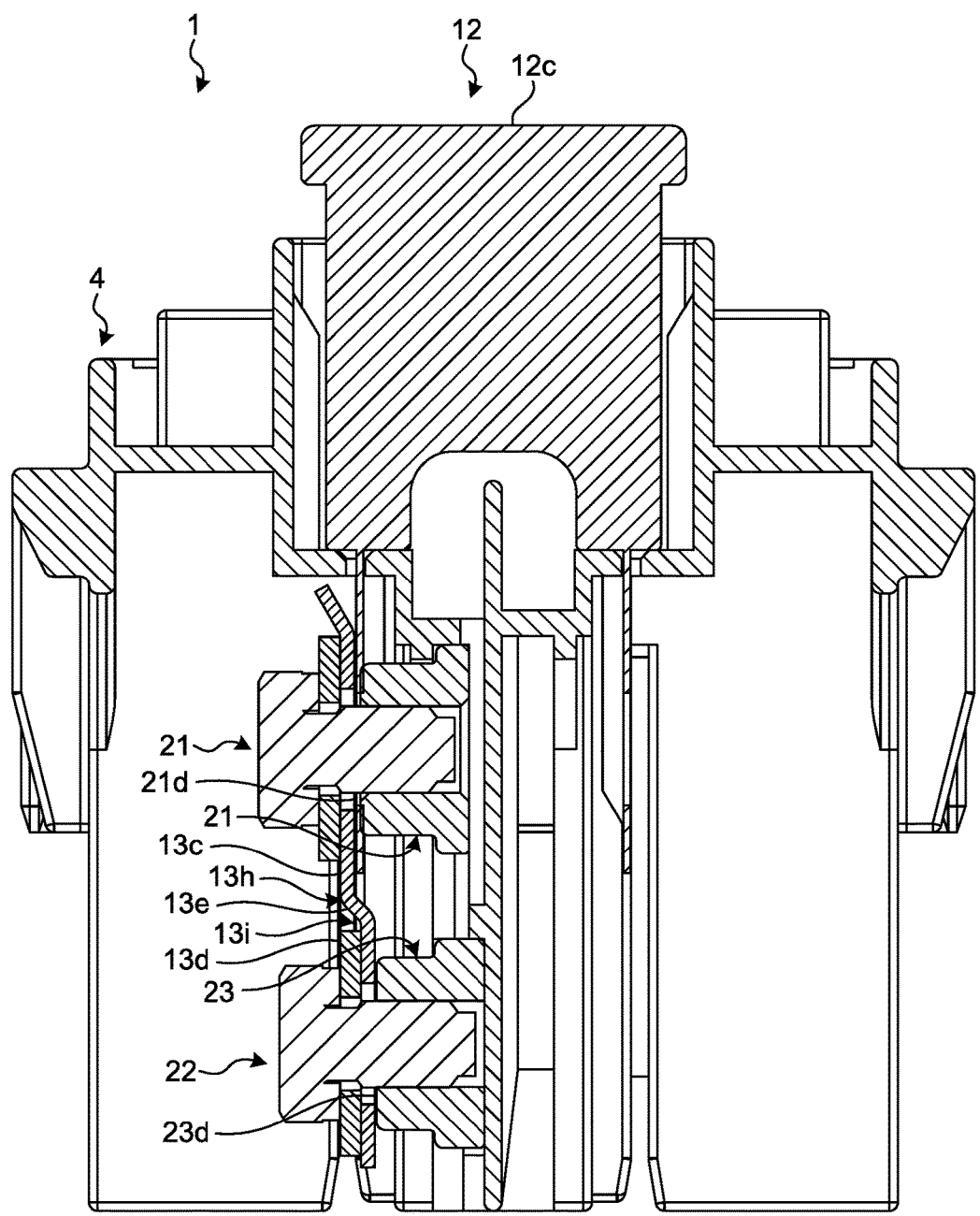
FIG. 11 is a sectional view for explaining an inclined portion of a busbar of the first embodiment.

FIG. 7 illustrates a section of a block 4 in a section VII-VII of FIG. 3. FIG. 8 illustrates a section of the block 4 in a section VIII-VIII of FIG. 3. Sectional views of FIGS. 9 to 11 are sectional views in the same sectional position as that of FIG. 7.

As illustrated in FIG. 1, an electrical connection box 1 according to the first embodiment includes an upper cover 2 and a lower cover 3. The electrical connection box 1 is mounted on a vehicle, such as an automobile, and interconnects devices mounted on the vehicle. The electrical connection box 1 constitutes, together with electric wires W and W1, a wire harness WH. Electronic components accommodated in the electrical connection box 1 are connected to, for example, a battery and electrical components of the vehicle through the wires W and W1, and connectors.

The upper cover 2 and the lower cover 3 engage with each other to form an accommodation space that accommodates the block 4 illustrated in FIG. 2. As illustrated in FIG. 1, the electrical connection box 1 includes an electric wire insertion portion 11. The electric wire insertion portion 11 includes a semi-cylindrical cylinder constituting part 31 provided on the lower cover 3 and a semi-cylindrical cylinder constituting part 42 provided on the block 4. The two cylinder constituting parts 31 and 42 are combined to form the cylindrical electric wire insertion portion 11. The electric wires W and W1 are led out to an external space through the electric wire insertion portion 11.

As illustrated in FIG. 2, the block 4 includes a body 41 and the cylinder constituting part 42. The body 41 is a rectangular cuboid-shaped constituting part. The cylinder constituting part 42 projects from the body 41 toward a long-side direction of the body 41. The body 41 and the cylinder constituting part 42 are integrally formed of, for example, an insulating synthetic resin. In the following description, a "longitudinal direction X" refers to the long-side direction of the block 4 and the electrical connection box 1, and represents a direction in which the electric wires W and W1 are led out of the electrical connection box 1. A "height direction Z" refers to a direction in which the upper cover 2 fits with the lower cover 3. A "lateral direction Y" refers to the width direction of the block 4 and the electrical connection box 1, and corresponds to a direction orthogonal to the longitudinal direction X and the height direction Z.

As illustrated in FIG. 2, the block 4 includes a fusible link (FL) holding portion 43 that holds a fusible link 12. The FL holding portion 43 is a recess that fits with the fusible link 12. The fusible link 12 is interposed between a power supply, such as the battery, and electric devices mounted on the vehicle. The electric devices connected to the fusible link 12 include, for example, a starter motor and an alternator. The fusible link 12 includes a fusible portion that is fused and disconnected when a value of current flowing therethrough reaches a predetermined upper limit current value or more. As illustrated in FIG. 2, the block 4 further includes a plurality of component holding portions 44 that hold electronic components. The component holding portions 44 hold, for example, another fusible link 8. The FL holding portion 43 and the component holding portions 44 are disposed on the upper cover 2 side of the block 4.

As illustrated in FIGS. 4 and 5, the fusible link 12 includes a body 12c and a pair of terminal portions 12a and 12b facing each other. The terminal portions 12a and 12b project from the body 12c in the height direction Z. The two terminal portions 12a and 12b face each other in the lateral direction Y. In the first embodiment, the body 12c side as viewed from distal ends of the terminal portions 12a and 12b is called the "upper side", and the distal end sides of the terminal portions 12a and 12b as viewed from the body 12c is called the "lower side". However, when the electrical connection box 1 is mounted on the vehicle, actual upper and lower directions may differ from those illustrated in the drawings.

As illustrated in FIGS. 2 to 5, a busbar 13 is electrically connected to one terminal portion 12a of the fusible link 12. As illustrated in FIG. 5, a busbar 14 is electrically connected to the other terminal portion 12b of the fusible link 12. The busbars 13 and 14 are examples of plate-shaped conductive members. The busbars 13 and 14 are made of a conductive metal. The busbars 13 and 14 of the first embodiment are flat plate-shaped, and orthogonal to the lateral direction Y. The two terminal portions 12a and 12b face each other in the lateral direction Y across the terminal portions 12a and 12b.

In the electrical connection box 1 of the first embodiment, a terminal 15 on the power supply side is fastened to the terminal portion 12b and the busbar 14. A screw member 16 and a nut 17 execute this fastening. The nut 17 is held by the block 4 at a position on the terminal portion 12a side of the terminal portion 12b. The terminal portion 12b and the busbar 14 each have a through-hole into which the screw member 16 is inserted. The through-hole of the busbar 14 is disposed at an end portion thereof in the longitudinal direction X. The screw member 16 is inserted into the through-hole of the busbar 14 and the through-hole of the terminal portion 12b, and is screwed into the nut 17. The screw member 16 is screwed into the nut 17 so as to fasten and fix the busbar 14 together with the terminal portion 12b to the block 4. A plurality of electronic components is electrically connected to the busbar 14.

As illustrated in FIGS. 4 to 6, in the electrical connection box 1 of the first embodiment, a first terminal 18 serving as a terminal on the electric apparatus side is fastened to the terminal portion 12a and the busbar 13. A second terminal 19 serving as a terminal on the electric apparatus side is fastened to the busbar 13. For example, the alternator and the starter motor are connected to the first terminal 18 and the second terminal 19. A first screw member 20 and a first nut 21 fasten the first terminal 18 to the terminal portion 12a and the busbar 13. A second screw member 22 and a second nut 23 fasten the second terminal 19 to the busbar 13.

As illustrated, for example, in FIG. 6, the busbar 13 includes a body 13a and a terminal fixing portion 13b. A plurality of electronic components is electrically connected to the body 13a. The terminal fixing portion 13b is disposed at one end in the longitudinal direction X of the body 13a. The terminal fixing portion 13b includes a first fixing portion 13c and a second fixing portion 13d. The first fixing portion 13c is connected to the body 13a, and integrated with the body 13a. The second fixing portion 13d is disposed below the first fixing portion 13c. The terminal fixing portion 13b is bent at two places so as to provide an inclined portion 13e between the first fixing portion 13c and the second fixing portion 13d. The inclined portion 13e lies between the first fixing portion 13c and the second fixing portion 13d. The inclined portion 13e is inclined with respect to the height direction Z. The upper end of the inclined portion 13e is connected to the lower end of the first fixing portion 13c, and the lower end of the inclined portion 13e is connected to the upper end of the second fixing portion 13d. The first fixing portion 13c is parallel to the second fixing portion 13d, and is located in a position displaced from the second fixing portion 13d in the lateral direction Y. In the busbar 13 of the first embodiment, the second fixing portion 13d is located at a position closer to the terminal portion 12b than the first fixing portion 13c in the lateral direction Y.

Through-holes 13f and 13g are formed in the first fixing portion 13c and the second fixing portion 13d, respectively. A through-hole 12d corresponding to the through-hole 13f is formed in the terminal portion 12a of the fusible link 12. A through-hole 18a corresponding to the through-holes 13f and 12d is formed in the first terminal 18. A through-hole 19a corresponding to the through-hole 13g is formed in the second terminal 19.

The first nut 21 is held in a position facing the through-hole 12d. The first nut 21 includes a first flange portion 21a and a cylindrical portion 21c. A screw hole 21b is formed in the cylindrical portion 21c. The first flange portion 21a projects in radial directions from one end in the axial direction of the cylindrical portion 21c. The first flange portion 21a is a plate-shaped constituting part having a rectangular outer shape. The first flange portion 21a is held by the block 4. A structure that holds the first nut 21 and the second nut 23 with the block 4 will be described later.

The first nut 21 is held in a position on the terminal portion 12b side of the terminal portion 12a. In other words, the first nut 21 is held in a position between the pair of terminal portions 12a and 12b. The busbar 13 is disposed in a position opposite to the first nut 21 across the terminal portion 12a. The block 4 has a slit, into which the busbar 13 is inserted. The first terminal 18 is fixed to the first fixing portion 13c so as to pinch the busbar 13 and the terminal portion 12a between the first terminal 18 and the first nut 21. The first screw member 20 is inserted into the through-holes 18a, 13f, and 12d, in this order, and is screwed into the screw hole 21b of the first nut 21 to fasten together the first terminal 18, the busbar 13, and the terminal portion 12a. That is, the first nut 21 is screwed with the first screw member 20 to be fastened to the busbar 13.

The second nut 23 is held in a position facing the through-hole 13g. The second nut 23 includes a second flange portion 23a and a cylindrical portion 23c. A screw hole 23b is formed in the cylindrical portion 23c. The second flange portion 23a projects in radial directions from one end in the axial direction of the cylindrical portion 23c. The second flange portion 23a is a plate-shaped constituting part having a rectangular outer shape. The second flange portion 23a is held by the block 4.

The second nut 23 is held in a position on the terminal portion 12b side of the busbar 13. The second terminal 19 is fixed to the second fixing portion 13d so as to pinch the busbar 13 between the second terminal 19 and the second nut 23. The second screw member 22 is inserted into the through-holes 19a and 13g, in this order, and is screwed into the screw hole 23b of the second nut 23 to fasten together the second terminal 19 and the busbar 13. The second nut 23 is screwed with the second screw member 22 to be fastened to the busbar 13.

A holding portion 5 provided in the block 4 will be described with reference to FIGS. 7 and 8. The holding portion 5 holds the first flange portion 21a of the first nut 21 and the second flange portion 23a of the second nut 23. The holding portion 5 is provided below the FL holding portion 43 in the block 4. As illustrated in FIG. 9, the holding portion 5 of the first embodiment extends in the height direction Z between the pair of terminal portions 12a and 12b. The holding portion 5 forms a path P1, into which the first flange portion 21a and the second flange portion 23a are inserted. The path P1 formed by the holding portion 5 is configured to open toward a space below the block 4. As illustrated in FIG. 9, the two flange portions 21a and 23a are inserted from an opening 50 at the lower end of the holding portion 5. The flange portions 21a and 23a are inserted into the holding portion 5 in an attitude of facing the terminal portion 12a, in other words, in such an attitude that the axial directions of the screw holes 21b and 23b correspond to the facing direction of the terminal portions 12a and 12b.

As illustrated in FIG. 8, the holding portion 5 includes a first wall portion 51, a second wall portion 52, a third wall portion 53, a fourth wall portion 54, and a fifth wall portion 55. The wall portions 51, 52, 53, 54, and 55 extend in the height direction Z. The five wall portions 51, 52, 53, 54, and 55 are configured to each have a C-shaped sectional shape.

As illustrated in FIG. 8, the first wall portion 51 is a wall portion having both surfaces orthogonal to the lateral direction Y. The second wall portion 52 is a wall portion that is connected to one end in the longitudinal direction X of the first wall portion 51, and that is orthogonal to the first wall portion 51. The fourth wall portion 54 is a wall portion that is connected to the other end in the longitudinal direction X of the first wall portion 51, and that is orthogonal to the first wall portion 51. The second wall portion 52 and the fourth wall portion 54 face each other in the longitudinal direction X. In the case of each of the second wall portion 52 and the fourth wall portion 54, a side of the first wall portion 51 in the lateral direction Y is called a "proximal end side", and a side opposite to the first wall portion 51 is called a "distal end side".

The third wall portion 53 is a wall portion projecting from the distal end of the second wall portion 52 toward the fourth wall portion 54. The fifth wall portion 55 is a wall portion projecting from the distal end of the fourth wall portion 54 toward the second wall portion 52. The third wall portion 53 and the fifth wall portion 55 face each other in the longitudinal direction X. The space between the distal end of the third wall portion 53 and the distal end of the fifth wall portion 55 serves as a clearance through which the cylindrical portions 21c and 23c of the nuts 21 and 23 pass.

As illustrated in FIGS. 7 and 8, the first wall portion 51 is provided with a projecting portion 56. The projecting portion 56 is provided onto the upper side from an intermediate portion in the height direction Z of the holding portion 5. That is, the projecting portion 56 is provided on the side of the first wall portion 51 closer to the body 12c of the fusible link 12. The projecting portion 56 is a projection elevated in the lateral direction Y toward the side of the third wall portion 53 and the fifth wall portion 55. As will be described below with reference to FIG. 9, the projecting portion 56 allows entry of the first flange portion 21a, and abuts on the second flange portion 23a to restrict entry of the second flange portion 23a.

FIG. 9 is a sectional view for explaining the insertion of the first nut 21 and the second nut 23 into the holding portion 5. As illustrated in FIG. 9, a thickness t2 of the second flange portion 23a is larger than a thickness t1 of the first flange portion 21a. The width of the first flange portion 21a is equal to the width of the second flange portion 23a. The first flange portion 21a having the smaller thickness t1 can enter a region provided with the projecting portion 56. In contrast, the second flange portion 23a having the larger thickness t2 is locked by the projecting portion 56. A width L1 of a clearance between a distal end surface in the projecting direction of the projecting portion 56 and the third wall portion 53 is equal to or more than the thickness t1 of the first flange portion 21a and smaller than the thickness t2 of the second flange portion 23a. A width L2 of a clearance between the distal end surface of the projecting portion 56 and the fifth wall portion 55 (refer to FIG. 8) has the same value as that of the width L1 of the above-described clearance. Accordingly, the first flange portion 21a is allowed to enter the clearance between the projecting portion 56 and the third wall portion 53 and the clearance between the projecting portion 56 and the fifth wall portion 55.

In contrast, the second flange portion 23a is locked by a locking surface 56a of the projecting portion 56, and restricted from entering the inner side of the locking surface 56a. The locking surface 56a is a surface at the lower end of the projecting portion 56, and faces downward. A portion of the holding portion 5 above the locking surface 56a serves as a first holding portion 61 that holds the first flange portion 21a. In other words, the first holding portion 61 is a portion of the holding portion 5 closer to the body 12c of the fusible link 12 than the locking surface 56a. A portion of the holding portion 5 below the locking surface 56a serves as a second holding portion 62 that holds the second flange portion 23a.

As illustrated in FIG. 8, the holding portion 5 includes a pair of holding projections 57, 57 that hold the first flange portion 21a. The holding projections 57, 57 are disposed one on each of the second wall portion 52 and the fourth wall portion 54. The holding projection 57 provided on the second wall portion 52 projects in the longitudinal direction X toward the fourth wall portion 54. The holding projection 57 provided on the fourth wall portion 54 projects in the longitudinal direction X toward the second wall portion 52. The pair of holding projections 57, 57 faces each other in the longitudinal direction X. As illustrated in FIG. 7, the holding projections 57, 57 are provided on the entrance side of the first holding portion 61, that is, at a lower end portion of the first holding portion 61.

As illustrated in FIG. 8, the holding portion 5 includes a pair of holding projections 59, 59 that hold the second flange portion 23a. The holding projections 59, 59 are disposed one on each of the second wall portion 52 and the fourth wall portion 54. The holding projection 59 provided on the second wall portion 52 projects in the longitudinal direction X toward the fourth wall portion 54. The holding projection 59 provided on the fourth wall portion 54 projects in the longitudinal direction X toward the second wall portion 52. The pair of holding projections 59, 59 face each other in the longitudinal direction X. As illustrated in FIG. 7, the holding projections 59, 59 are provided on the entrance side of the second holding portion 62, that is, in the vicinity of the opening 50 of the holding portion 5.

As illustrated in FIG. 9, the first flange portion 21a and the second flange portion 23a are inserted in this order into the holding portion 5. An inner wall portion 58 is provided at the innermost portion of the holding portion 5. The first flange portion 21a is inserted into a position of abutting on the inner wall portion 58. The first flange portion 21a is held from both sides in the height direction Z by the inner wall portion 58 and the holding projections 57, 57. The inner wall portion 58 and the holding projections 57, 57 position the first flange portion 21a in the height direction Z. The first flange portion 21a is held from both sides in the lateral direction Y by the projecting portion 56, the third wall portion 53, and the fifth wall portion 55. The projecting portion 56, the third wall portion 53, and the fifth wall portion 55 position the first flange portion 21a in the lateral direction Y. The first flange portion 21a is held from both sides in the longitudinal direction X by the second wall portion 52 and the fourth wall portion 54. The second wall portion 52 and the fourth wall portion 54 non-rotatably hold the first flange portion 21a, and position the first flange portion 21a in the longitudinal direction X.

The second flange portion 23a is inserted into a position of abutting on the locking surface 56a. The second flange portion 23a is held from both sides in the height direction Z by the locking surface 56a and the holding projections 59, 59. The locking surface 56a and the holding projections 59, 59 position the second flange portion 23a in the height direction Z. The second flange portion 23a is held from both sides in the lateral direction Y by the first wall portion 51, the third wall portion 53, and the fifth wall portion 55. The first wall portion 51, the third wall portion 53, and the fifth wall portion 55 position the second flange portion 23a in the lateral direction Y. The second flange portion 23a is held from both sides in the longitudinal direction X by the second wall portion 52 and the fourth wall portion 54. The second wall portion 52 and the fourth wall portion 54 non-rotatably hold the second flange portion 23a, and position the second flange portion 23a in the longitudinal direction X.

After the first flange portion 21a and the second flange portion 23a have been held by the holding portion 5, the busbar 13 is inserted into the block 4. The busbar 13 is inserted into a slit 47 of the block 4, and faces the first nut 21 and the second nut 23 in the lateral direction Y. Then, the first terminal 18 and the second terminal 19 are assembled to the busbar 13 by the first screw member 20 and the second screw member 22. As illustrated in FIG. 10, the first screw member 20 screwed into the first nut 21 fastens together the first terminal 18, the busbar 13, and the terminal portion 12a to electrically connect them, and the second screw member 22 screwed into the second nut 23 fastens together the second terminal 19 and the busbar 13 to electrically connect them.

The block 4 of the first embodiment can hold the nuts 21 and 23 so as to be arranged in the projecting direction of the terminal portion 12a of the fusible link 12. Since the nuts 21 and 23 are held in the height direction Z, the terminals 18 and 19 can be fastened to the busbar 13 using a limited space. In the first embodiment, the thickness t1 of the first flange portion 21a is smaller than the thickness t2 of the second flange portion 23a. Due to an entering restriction structure (projecting portion 56) using the difference between the thicknesses t1 and t2, the two flange portions 21a and 23a are held while being arranged in the depth direction of the holding portion 5. If the block 4 does not include the holding portion 5 such as in the first embodiment, the block 4 is difficult to hold a plurality of nuts in the limited space defined by the distance between the pair of terminal portions 12a and 12b. Due to this, only one nut must be used to hold the terminal portions 12a and 12b. As a result, if the plurality of terminals 18 and 19 are used to fasten the busbar 13, a structure will be required, such that the nuts and the screw members are fastened to respective both ends in the longitudinal direction X of the busbar 13. This will lead to increase in size of the busbar 13 and the block 4.

In contrast, the holding portion 5 of the first embodiment enables reduction in size of the busbar 13 at least in the longitudinal direction X. Thus, the electrical connection box 1 of the first embodiment provides an effect that the size reduction can be achieved.

In the first embodiment, the busbar 13 is provided with the inclined portion 13e between the first fixing portion 13c and the second fixing portion 13d. This configuration absorbs tolerances to obtain an appropriate abutment state, as will be described below with reference to FIG. 11. As illustrated in FIG. 11, in the busbar 13, the first fixing portion 13c and the second fixing portion 13d parallel to each other are connected to each other via the inclined portion 13e. Both a boundary portion between the first fixing portion 13c and the inclined portion 13e and a boundary portion between the second fixing portion 13d and the inclined portion 13e are curved. That is, two curved portions 13h and 13i lie between the first fixing portion 13c and the second fixing portion 13d.

Due to tolerances of the first nut 21 and the second nut 23, and to assembly tolerances for fitting of the two nuts 21 and 23 with the holding portion 5, there is a possibility that a step (difference in level) is generated between a distal end surface 21d of the first nut 21 and a distal end surface 23d of the second nut 23. Even if such a step is generated between the distal end surfaces 21d and 23d, the busbar 13 can absorb the influence of the step. The busbar 13 can change the degrees of curvature of the curved portions 13h and 13i so as to allow the first fixing portion 13c to stay in parallel with the distal end surface 21d, and to allow the second fixing portion 13d to stay in parallel with the distal end surface 23d. Thus, the busbar 13 of the first embodiment restrains the first fixing portion 13c and the second fixing portion 13d from being fastened while being inclined relative to the distal end surfaces 21d and 23d.

The busbar 13 of the first embodiment is effective even if the distal end surfaces 21d and 23d cannot be disposed so as to be positioned at the same level. For example, in a case where existing nuts are used as the first nut 21 and the second nut 23, it is difficult for a design to position the distal end surfaces 21d and 23d in the same plane. In such cases, providing the inclined portion 13e of the busbar 13 in accordance with the two distal end surfaces 21d and 23d allows the busbar 13 to absorb the step between the distal end surfaces 21d and 23d.

Figure 12:
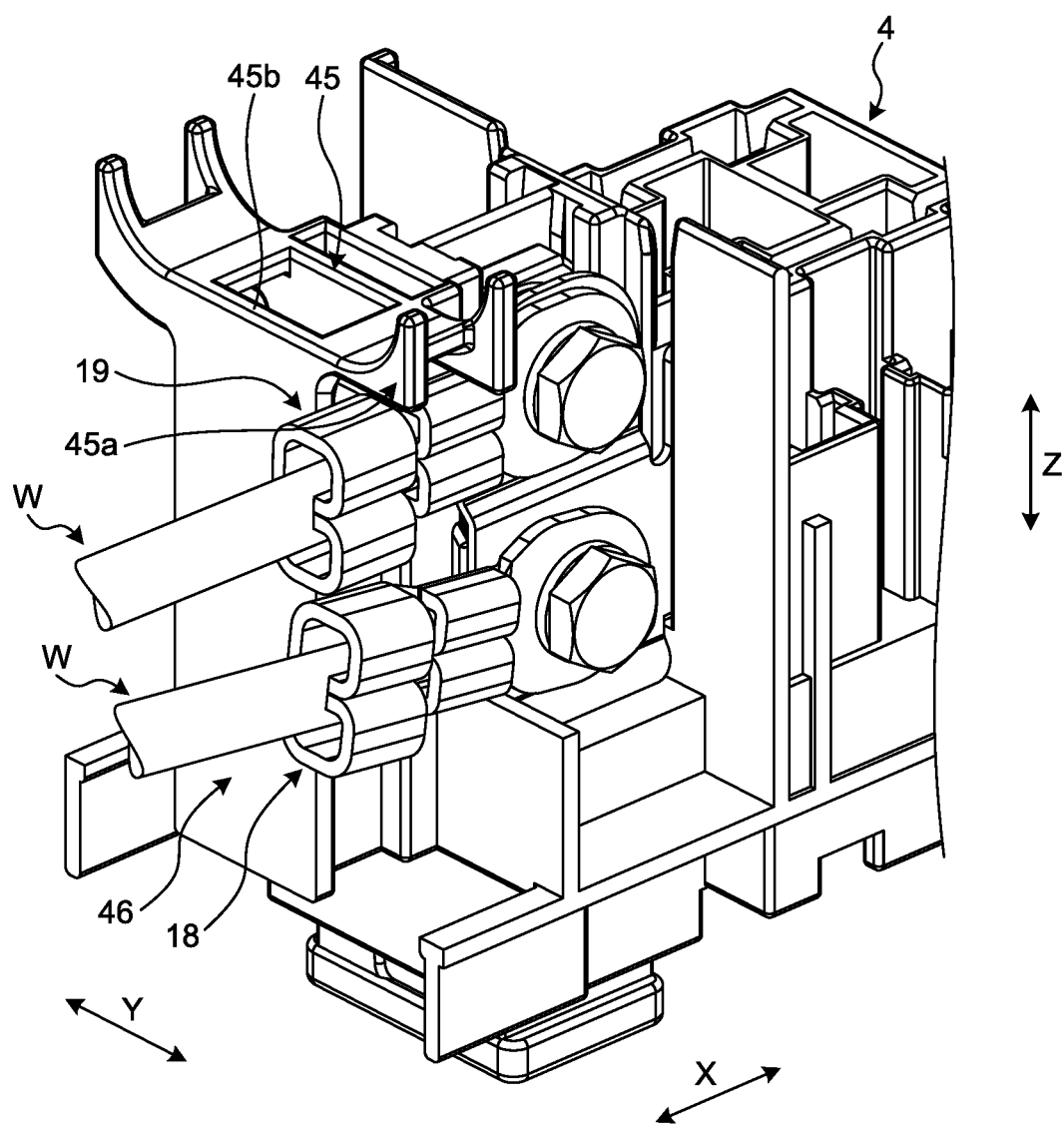
FIG. 12 is a perspective view illustrating a restricting portion of the first embodiment.
Figure 13:
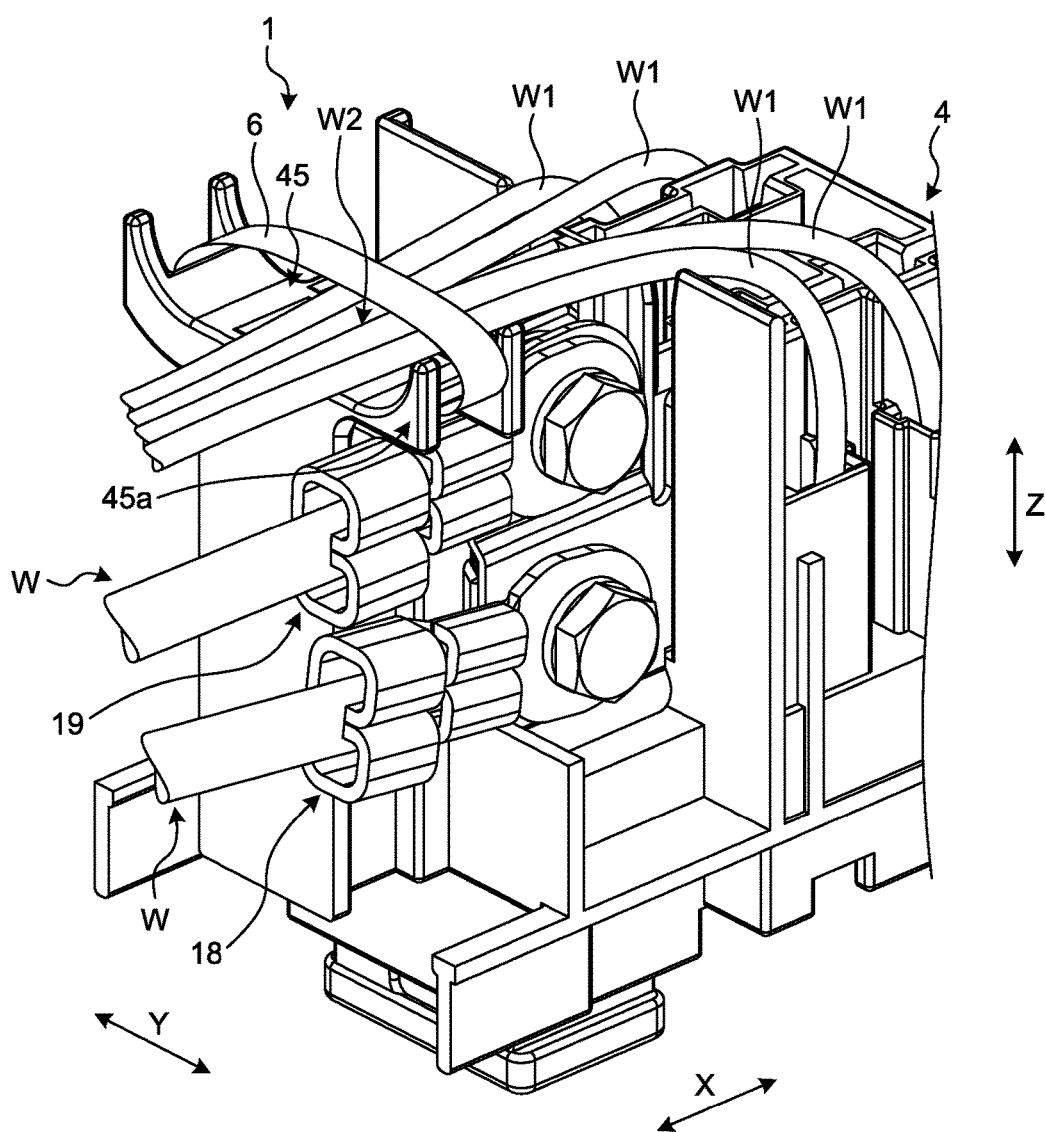
FIG. 13 is a perspective view for explaining an effect provided by the restricting portion of the first embodiment.
Figure 14:
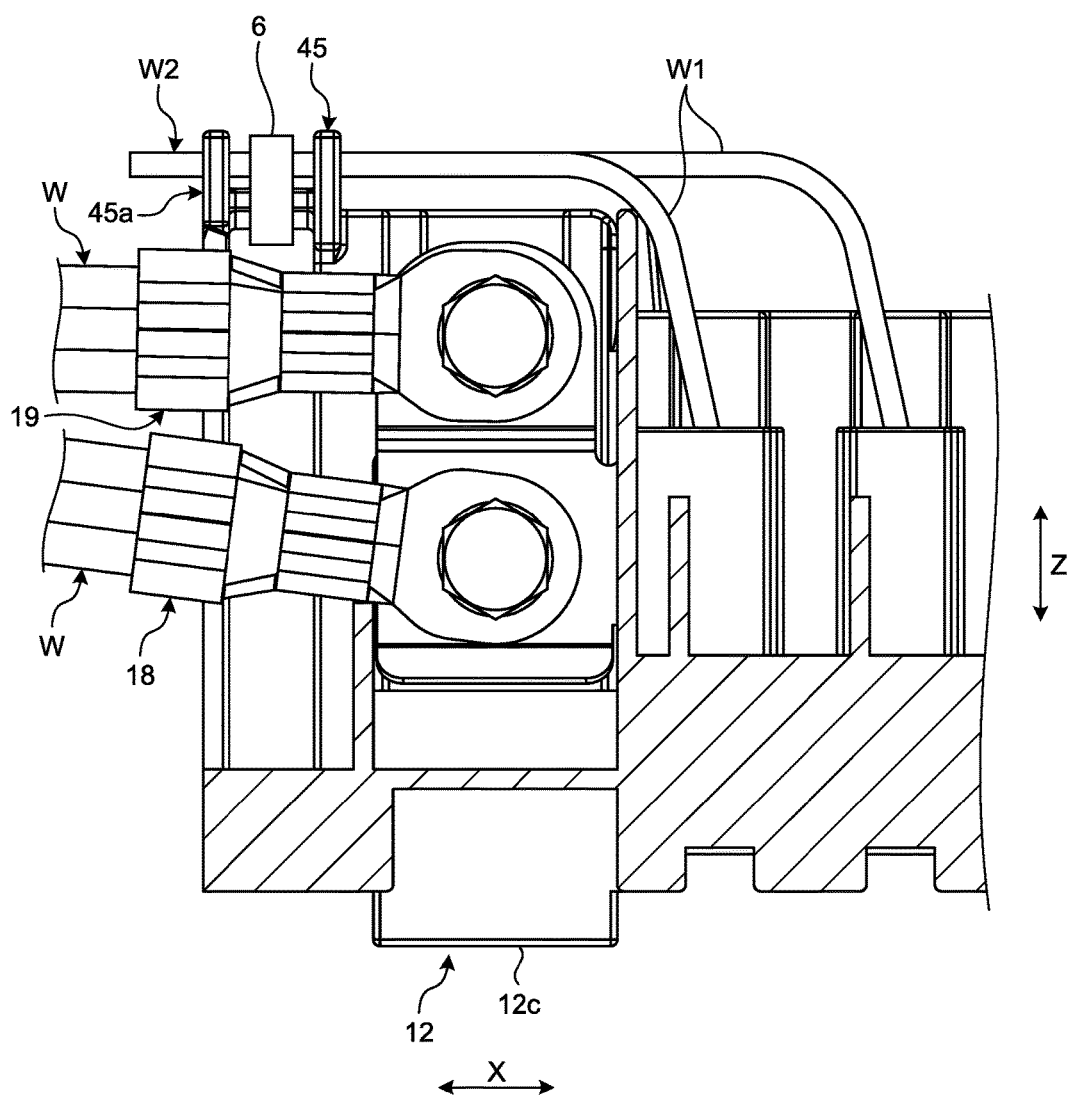
FIG. 14 is a side view for explaining the effect provided by the restricting portion of the first embodiment.

As will be described below with reference to FIGS. 12 to 14, the block 4 of the first embodiment includes a restricting portion 45a that restricts the second terminal 19 from rotating. FIGS. 12 and 13 illustrate perspective views obtained by viewing the block 4 from below. The restricting portion 45a is a part of an electric wire holding portion 45. The electric wire holding portion 45 is provided at the lower end of the block 4. More specifically, the electric wire holding portion 45 is provided at the lower end of a wall portion 46 facing the terminals 18 and 19. The electric wire holding portion 45 includes a U-shaped receiving portion 45b that is open downward. The electric wire holding portion 45 includes the restricting portion 45a that projects in the lateral direction Y from the wall portion 46 toward the second terminal 19 side. The restricting portion 45a constitutes one side of the U-shaped receiving portion 45b of the electric wire holding portion 45. The restricting portion 45a projects to a space below the second terminal 19.

As illustrated in FIG. 13, the electric wire holding portion 45 holds a plurality of electric wires W1. The respective electric wires W1 are connected to the electronic components, such as the fusible link 8, held by the block 4. The electric wires W1 led out from the electronic components toward the lower side of the block 4 are bundled as an electric wire bundle W2. The electric wire bundle W2 is placed on the electric wire holding portion 45, and held by a tie band 6. The electric wire bundle W2 is led out of the electrical connection box 1 together with the electric wires W connected to the terminals 18 and 19. The restricting portion 45a is located between the electric wire bundle W2 and the second terminal 19, and restricts the second terminal 19 from rotating toward the electric wire bundle W2. The restricting portion 45a restricts the second terminal 19 from contacting with the electric wire bundle W2. The restricting portion 45a also restrains the electric wires W from vibrating due to rotation of the second terminal 19.

As described above, the electrical connection box 1 of the first embodiment includes the fusible link 12, the busbar 13, the first nut 21, the second nut 23, and the block 4. The fusible link 12 includes the pair of terminal portions 12a and 12b facing each other. The busbar 13 is an example of a plate-shaped conductive member electrically connected to the terminal portion 12a of the fusible link 12. The first nut 21 includes the first flange portion 21a, and is screwed with the first screw member 20 to be fastened to the busbar 13. The second nut 23 includes the second flange portion 23a, and is screwed with the second screw member 22 to be fastened to the busbar 13. The block 4 includes the holding portion 5 that holds the first flange portion 21a and the second flange portion 23a, and holds the fusible link 12.

The holding portion 5 extends between the pair of terminal portions 12a and 12b in the projecting direction of the terminal portions 12a and 12b. The holding portion 5 of the first embodiment extends in the height direction Z of the block 4. The holding portion 5 has the insertion port (opening 50), into which the first flange portion 21a and the second flange portion 23a are inserted. The holding portion 5 includes the first holding portion 61 that is located on the back side in the direction of insertion and that holds the first flange portion 21a, and includes the second holding portion 62 that is located on the entrance side in the direction of insertion and that holds the second flange portion 23a.

At least one of the thickness and the width of the second flange portion 23a is larger than that of the first flange portion 21a. For example, in the first embodiment, the thickness t2 of the second flange portion 23a is larger than the thickness t1 of the first flange portion 21a. The holding portion 5 includes the projecting portion 56. The projecting portion 56 allows the first flange portion 21a to enter the first holding portion 61, and abuts on the second flange portion 23a to restrict the second flange portion 23a from entering the first holding portion 61.

The electrical connection box 1 of the first embodiment holds the two flange portions 21a and 23a in the state where the first flange portion 21a and the second flange portion 23a are arranged side by side in the depth direction of the holding portion 5. In the electrical connection box 1 of the first embodiment, the places where the first terminal 18 and the second terminal 19 are connected to the busbar 13 can be concentrated on the terminal fixing portion 13b. Consequently, the electrical connection box 1 of the first embodiment can hold the nuts 21 and 23 and fasten the terminals 18 and 19 to the busbar 13, using the limited space between the pair of terminal portions 12a and 12b. As a result, the size of the electrical connection box 1 can be reduced by the reduction in size of the busbar 13.

According to the first embodiment, the thickness t2 of the second flange portion 23a is larger than the thickness t1 of the first flange portion 21a. The projecting portion 56 projects toward the lateral direction Y. The lateral direction Y corresponds to the thickness direction of the first flange portion 21a and the second flange portion 23a. The projecting portion 56 is provided in the first holding portion 61 in the direction of insertion of the first flange portion 21a and the second flange portion 23a. The projecting portion 56 supports the first flange portion 21a from a side opposite to the busbar 13 in the thickness direction of the flange portions 21a and 23a. The projecting portion 56 supports the first flange portion 21a when the first screw member 20 is screwed into the first flange portion 21a. The projecting portion 56 has both a function as a supporting portion for supporting the first flange portion 21a and a function as a restricting portion for restricting the entry of the second flange portion 23a.

The busbar 13 of the first embodiment includes the first fixing portion 13c to which the first nut 21 is fastened, and the second fixing portion 13d to which the second nut 23 is fastened. The first fixing portion 13c is parallel to the second fixing portion 13d. The busbar 13 has the curved portions 13h and 13i between the first fixing portion 13c and the second fixing portion 13d. The curved portions 13h and 13i absorb the tolerances and the assembly tolerances of the nuts 21 and 23. The curved portions 13h and 13i can solve the problem of the difference in level occurring between the distal end surfaces 21d and 23d of the nuts 21 and 23.

The block 4 of the first embodiment includes the electric wire holding portion 45 that holds the electric wires W1 led out of the electronic components held by the block 4. The electric wire holding portion 45 includes the restricting portion 45a located between the electric wires W1 and the second terminal 19 fastened to the busbar 13. The restricting portion 45a restricts the second terminal 19 from rotating toward the electric wires W1. The restricting portion 45a can restrict the second terminal 19 from contacting with the electric wires W1.

As illustrated in FIG. 2, in the electrical connection box 1 of the first embodiment, the electric wires W are led out of the block 4 in the longitudinal direction X. Consequently, the block 4 and the electrical connection box 1 can each have a smaller height than in the case where the electric wires W are led out in the height direction Z.

For example, the shape of the block 4, the arrangement of the fusible link 12, and the shape of the holding portion 5 are not limited to those exemplified above. The respective shapes and the arrangement can be modified as appropriate. The number of nuts held by the holding portion 5 is not limited to two. For example, in addition to the first nut 21 and the second nut 23, a third nut may be held by the holding portion 5.

Second Embodiment

Figure 15:
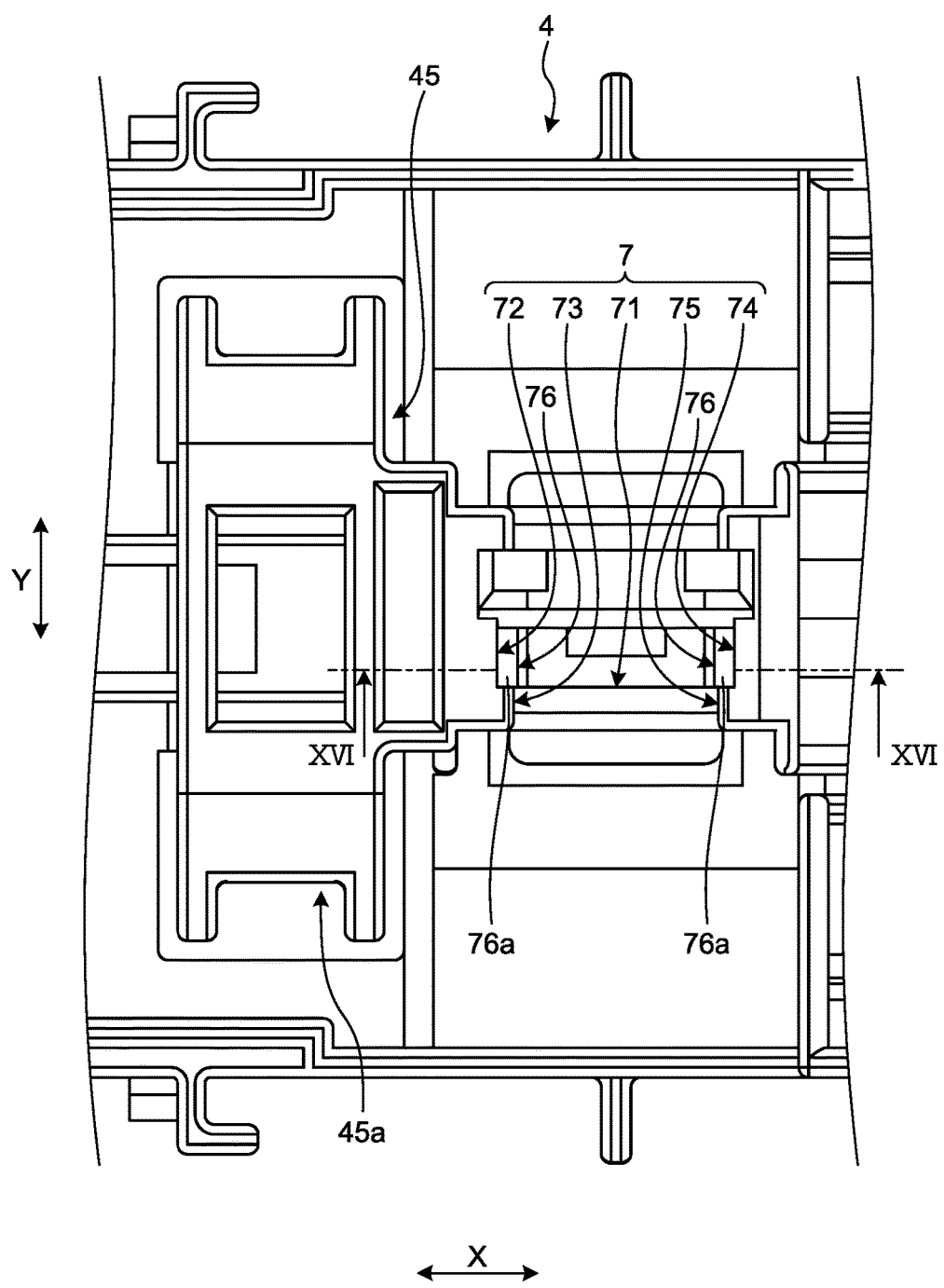
FIG. 15 is a bottom view of the block according to a second embodiment of the present invention.
Figure 16:
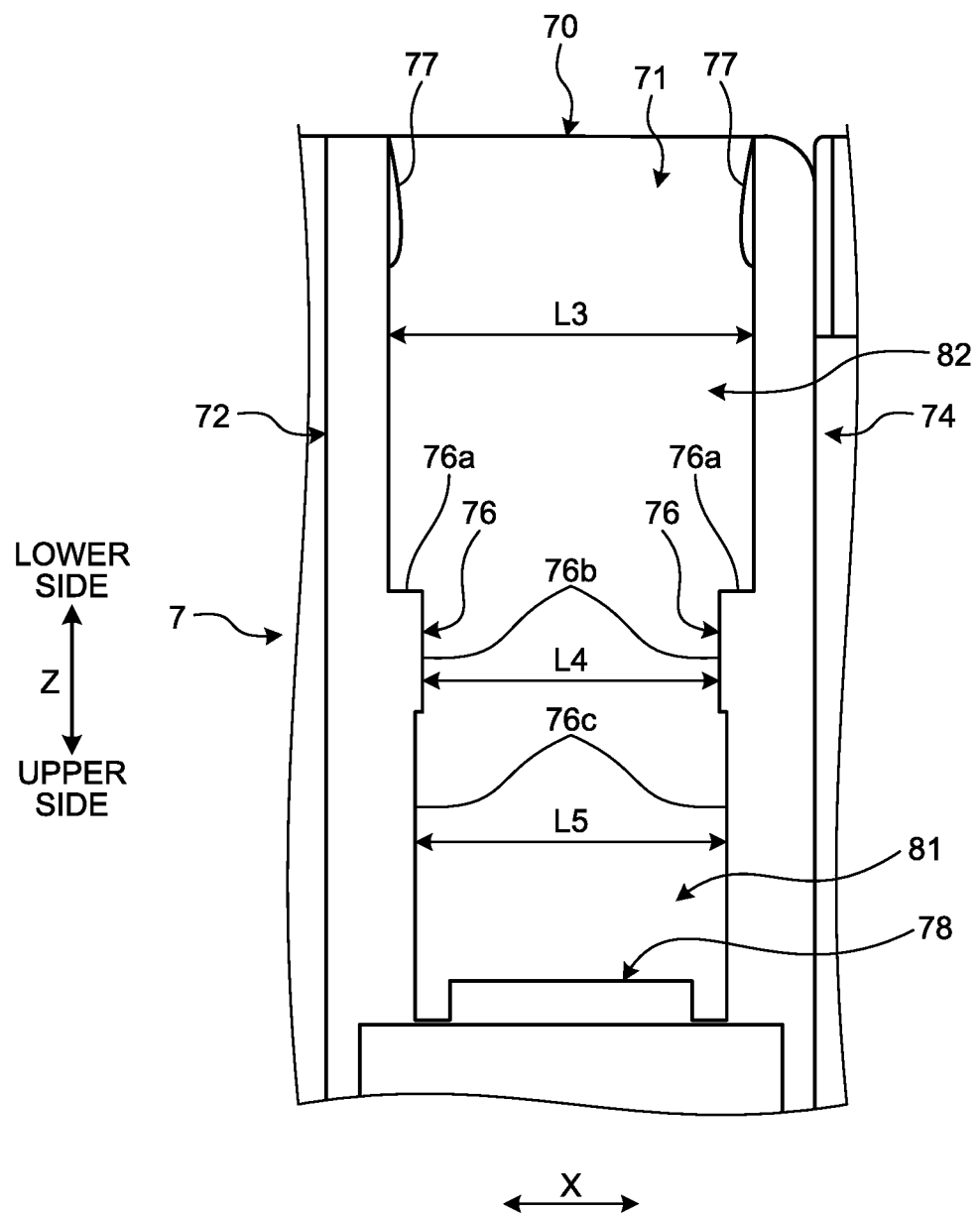
FIG. 16 is a sectional view illustrating a holding portion according to the second embodiment.
Figure 17:
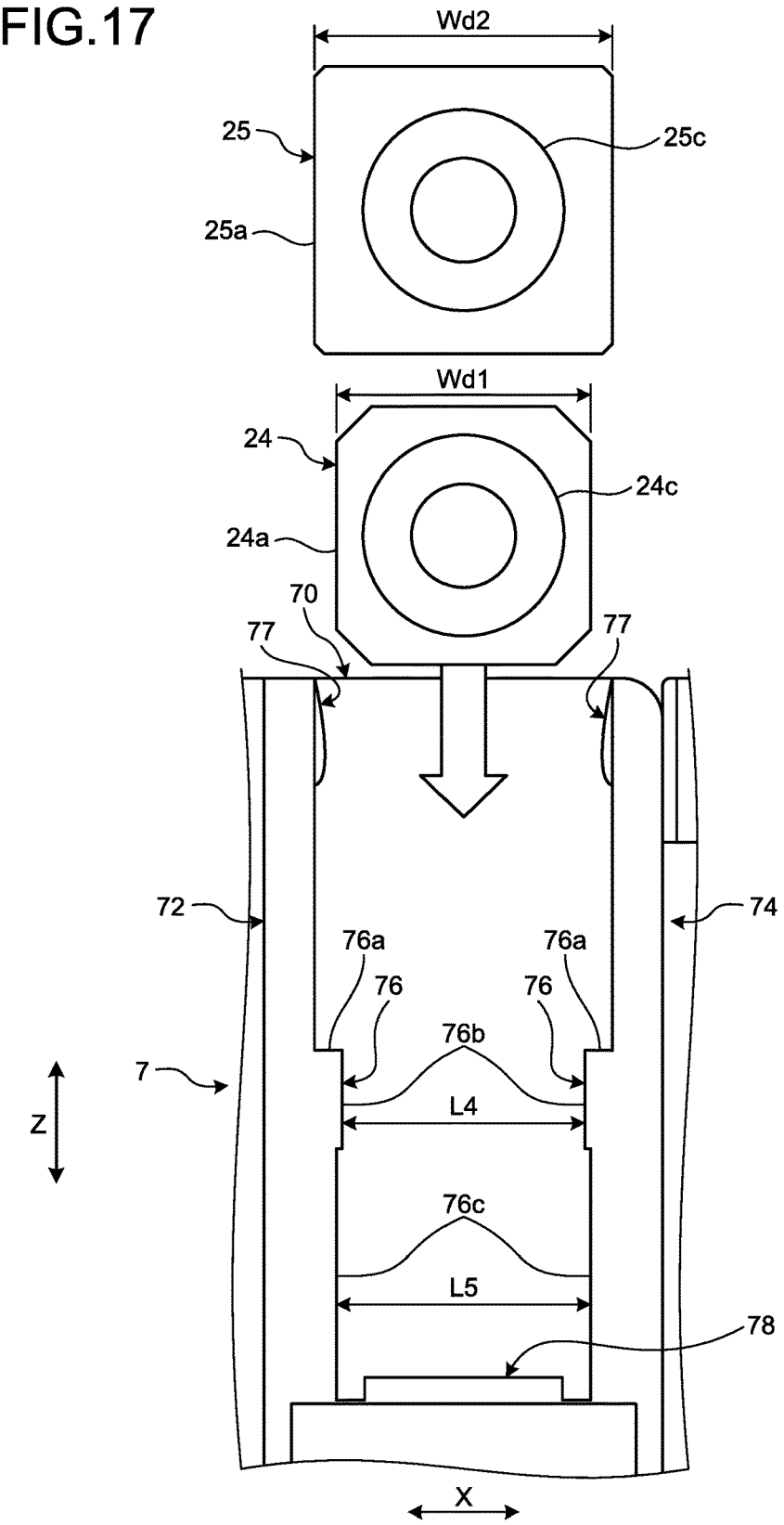
FIG. 17 is a sectional view illustrating nuts to be inserted into the holding portion of the second embodiment.
Figure 18:
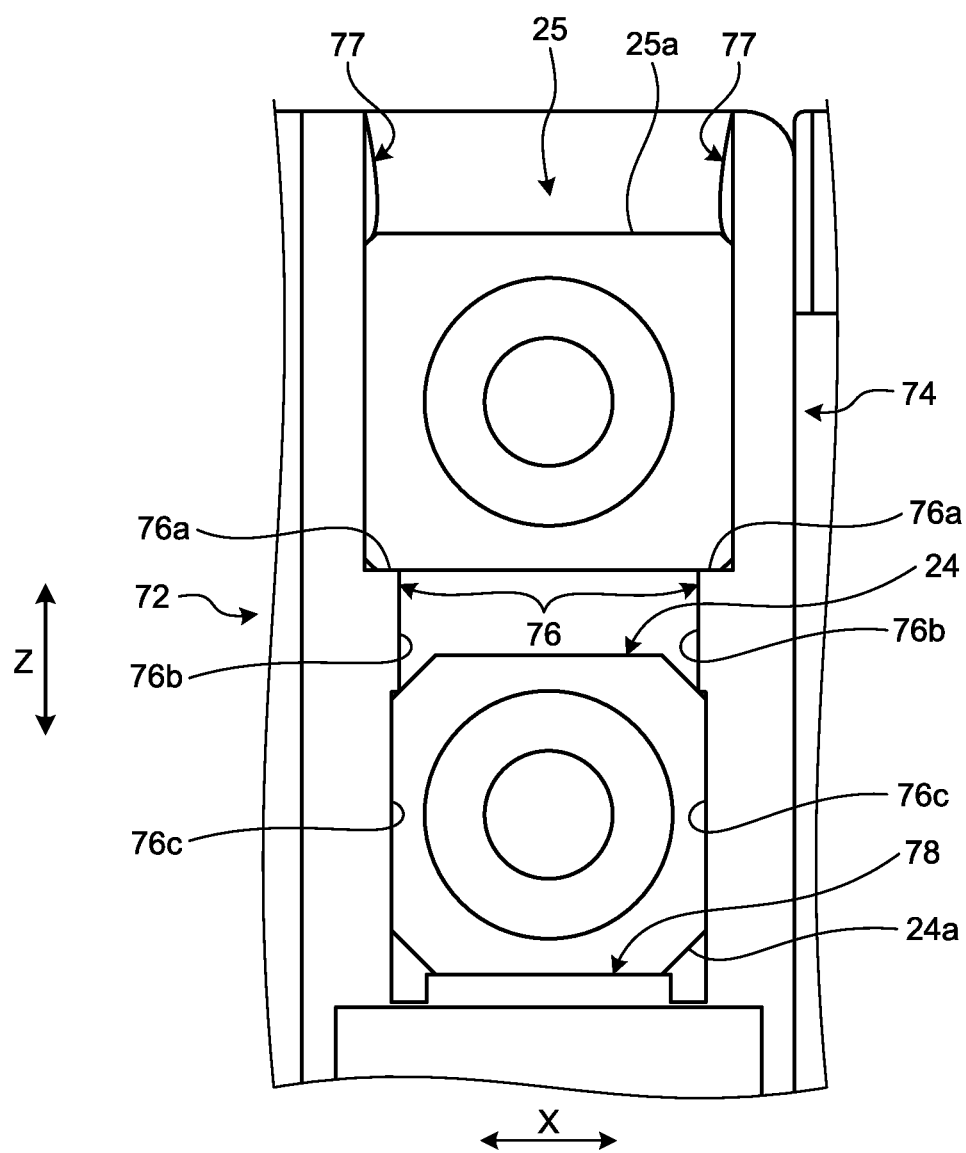
FIG. 18 is a sectional view illustrating the nuts held by the holding portion of the second embodiment.

A second embodiment of the present invention will be described with reference to FIGS. 15 to 18. In the second embodiment, components having the same functions as those described above in the first embodiment will be assigned with the same reference numerals, and the description thereof will not be repeated. FIG. 15 is a bottom view of the block according to the second embodiment. FIG. 16 is a sectional view illustrating a holding portion according to the second embodiment. FIG. 17 is a sectional view illustrating nuts to be inserted into the holding portion of the second embodiment. FIG. 18 is a sectional view illustrating the nuts held by the holding portion of the second embodiment. FIG. 16 illustrates a section XVI-XVI of FIG. 15.

As illustrated in FIGS. 17 and 18, a holding portion 7 according to the second embodiment holds two nuts 24 and 25 having different widths so as to be arranged in the height direction Z. As illustrated in FIG. 17, the first nut 24 includes a first flange portion 24a and a cylindrical portion 24c, and the second nut 25 includes a second flange portion 25a and a cylindrical portion 25c. A width Wd1 of the first flange portion 24a is smaller than a width Wd2 of the second flange portion 25a. In the second embodiment, the thickness of the first flange portion 24a is equal to the thickness of the second flange portion 25a.

As illustrated in FIG. 15, the holding portion 7 includes a first wall portion 71, a second wall portion 72, a third wall portion 73, a fourth wall portion 74, and a fifth wall portion 75. The wall portions 71, 72, 73, 74, and 75 extend in the height direction Z. The first wall portion 71 is a wall portion with both surfaces orthogonal to the lateral direction Y. The second wall portion 72 is a wall portion that is connected to one end in the longitudinal direction X of the first wall portion 71, and that is orthogonal to the first wall portion 71. The fourth wall portion 74 is a wall portion that is connected to the other end in the longitudinal direction X of the first wall portion 71, and that is orthogonal to the first wall portion 71. The second wall portion 72 and the fourth wall portion 74 face each other in the longitudinal direction X. The third wall portion 73 is a wall portion projecting from the distal end of the second wall portion 72 toward the fourth wall portion 74. The fifth wall portion 75 is a wall portion projecting from the distal end of the fourth wall portion 74 toward the second wall portion 72. The third wall portion 73 and the fifth wall portion 75 face each other in the longitudinal direction X. The space between the distal end of the third wall portion 73 and the distal end of the fifth wall portion 75 serves as a clearance through which the cylindrical portions 24c and 25c of the nuts 24 and 25 (refer to FIG. 17) pass.

As illustrated in FIG. 16, each of the second wall portion 72 and the fourth wall portion 74 includes a projecting portion 76. The projecting portions 76 are provided on the inner side (upper side) from intermediate portions in the height direction Z of the holding portion 7. The projecting portion 76 of the second wall portion 72 is a projection elevated toward the fourth wall portion 74. The projecting portion 76 of the fourth wall portion 74 is a projection elevated toward the second wall portion 72. The projecting portions 76 allow entry of the first flange portion 24a, and abut on the second flange portion 25a to restrict entry of the second flange portion 25a.

A path width L3 illustrated in FIG. 16 is a path width of the holding portion 7 in a range on the entrance side (lower side) in the height direction Z of the projecting portions 76. The path width L3 is a width between the second wall portion 72 and the fourth wall portion 74. Path widths L4 and L5 between the pair of projecting portions 76, 76 are smaller than the path width L3. The path width L4 is a distance between the projecting portions 76, 76 at entrance portions 76b of the projecting portions 76. The path width L5 at inner portions 76c of the projecting portions 76, 76 is larger than the path width L4 between the entrance portions 76b. The inner portions 76c are depressed by one step from the entrance portions 76b.

As illustrated in FIG. 17, the first flange portion 24a and the second flange portion 25a are inserted in this order from an opening 70 into the holding portion 7. The path width L4 between the entrance portions 76b is set so as to allow the entry of the first flange portion 24a, and to restrict the entry of the second flange portion 25a. The path width L4 between the entrance portions 76b is slightly smaller than the width Wd1 of the first flange portion 24a. The first flange portion 24a enters the inner portions 76c while elastically deforming the entrance portions 76b.

A region on the inner side of the entrance portions 76b in the holding portion 7 serves as a first holding portion 81 for holding the first flange portion 24a. An inner wall portion 78 is provided on the innermost portion of the holding portion 7. The first flange portion 24a is inserted to a position of abutting on the inner wall portion 78. The entrance portions 76b and the inner wall portion 78 jointly hold the first flange portion 24a from both sides in the height direction Z. The first flange portion 24a is held from both sides in the longitudinal direction X by the inner portions 76c, 76c. The first flange portion 24a is also held from both sides in the lateral direction Y by the first wall portion 71, the third wall portion 73, and the fifth wall portion 75.

The path width L4 between the entrance portions 76b is set so as to restrict the entry of the second flange portion 25a. The path width L4 between the entrance portions 76b is sufficiently smaller than the width Wd2 of the second flange portion 25a. The second flange portion 25a is locked by locking surfaces 76a of the projecting portions 76. The locking surfaces 76a are downward-facing end surfaces of the projecting portions 76. The locking surfaces 76a abut on the second flange portion 25a to restrict the second flange portion 25a from entering the first holding portion 81.

A portion of the holding portion 7 below the locking surfaces 76a, that is, a region on the entrance side serves as a second holding portion 82 that holds the second flange portion 25a. The second holding portion 82 includes a pair of holding projections 77 that hold the second flange portion 25a. The holding projections 77 are provided one on each of the second wall portion 72 and the fourth wall portion 74. The holding projection 77 disposed on the second wall portion 72 projects toward the fourth wall portion 74. The holding projection 77 disposed on the fourth wall portion 74 projects toward the second wall portion 72. The pair of holding projections 77, 77 faces each other in the longitudinal direction X. The holding projections 77, 77 are provided on the entrance side of the second holding portion 82, that is, at a lower end portion of the holding portion 7. The holding projections 77, 77 and the locking surfaces 76a jointly hold the second flange portion 25a from both sides in the height direction Z. The second flange portion 25a is held from both sides in the longitudinal direction X by the second wall portion 72 and the fourth wall portion 74. The second flange portion 25a is also held from both sides in the lateral direction Y by the first wall portion 71, the third wall portion 73, and the fifth wall portion 75.

In the same manner as in the first embodiment described above, the first screw member 20 and the second screw member 22 are respectively screwed into the first flange portion 24a and the second flange portion 25a that are inserted into the holding portion 7. The first screw member 20 is screwed into the first nut 24 so as to fasten together the first terminal 18, the busbar 13, and the terminal portion 12a. The second screw member 22 is screwed into the second nut 25 so as to fasten together the second terminal 19 and the busbar 13.

As described above, in the second embodiment, the width Wd2 of the second flange portion 25a is larger than the width Wd1 of the first flange portion 24a. The projecting portions 76 project in the longitudinal direction X. The longitudinal direction X corresponds to the width direction of the first flange portion 24a and the second flange portion 25a. The projecting portions 76 are provided in the first holding portion 81 in the direction of insertion of the flange portion 24a and 25a. The projecting portions 76 pinch the first flange portion 24a in the width direction of the flange portion 24a and 25a to hold the first flange portion 24a. The projecting portions 76 have both a holding function of holding the first flange portion 24a and a function as a restricting portion that restricts the entry of the second flange portion 25a.

Modifications

Modifications of the above-described first and second embodiments will be described below. In the first and second embodiments, the busbar 13 may be connected with only one of the first terminal 18 and the second terminal 19. For example, in the first and second embodiment, the first nut 21 and the first screw member 20 may fasten the busbar 13 and the terminal portion 12a without the first terminal 18. In other words, the first nut 21 and the first screw member 20 may fasten the busbar 13 and the terminal portion 12a to fix the busbar 13 and the terminal portion 12a to the block 4.

The second flange portion may be larger than the first flange portion in both thickness and width. For example, in the first embodiment, the width of the second flange portion 23a may be larger than the width of the first flange portion 21a. In this case, the holding projection 57 may have a locking surface that locks the second flange portion 23a.

In the first and second embodiments, a holding portion similar to the holding portions 5 and 7 may be provided for the terminal portion 12b. In this case, the space between the terminal portions 12a and 12b can be used to hold a plurality of nuts, and thus a plurality of terminals can be fastened to the busbar 14.

The content disclosed in the embodiments and the modifications thereof described above may be carried out in appropriate combinations thereof.

An electrical connection box according to each of the present embodiments includes a fusible link including a pair of terminal portions facing each other, a plate-shaped conductive member electrically connected to one of the terminal portions, a first nut that includes a first flange portion and that is fastened to the conductive member by being screwed with a first screw member, a second nut that includes a second flange portion and that is fastened to the conductive member by being screwed with a second screw member, and a block that includes a holding portion holding the first flange portion and the second flange portion and that holds the fusible link.

The holding portion extends between the pair of terminal portions in a direction in which the terminal portions project. The holding portion includes an insertion port into which the first flange portion and the second flange portion are inserted, a first holding portion that is located on a back side in the direction of the insertion and that holds the first flange portion, and a second holding portion that is located on an entrance side in the direction of the insertion and that holds the second flange portion. At least one of the thickness and the width of the second flange portion is larger than that of the first flange portion. The holding portion includes a projecting portion that allows the first flange portion to enter the first holding portion, and that abuts on the second flange portion to restrict the second flange portion from entering the first holding portion.

The holding portion of the electrical connection box according to each of the present embodiments holds a plurality of nuts in the direction of the insertion. Accordingly, the electrical connection box according to each of the present embodiments provides an effect that a plurality of terminals can be fastened to the conductive member using a limited space between the pair of terminal portions.

Although the invention has been described with respect to the specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box comprising:
   a fusible link that includes a pair of terminal portions facing each other;
   a plate-shaped conductive member that is electrically connected to one of the terminal portions;
   a first nut that includes a first flange portion and that is fastened to the conductive member by being screwed with a first screw member;
   a second nut that includes a second flange portion and that is fastened to the conductive member by being screwed with a second screw member; and
   a block that includes a holding portion holding the first flange portion and the second flange portion and that holds the fusible link, wherein
   the holding portion extends between the pair of terminal portions in a direction in which the terminal portions project,
   the holding portion includes an insertion port into which the first flange portion and the second flange portion are inserted, a first holding portion that is located on a back side in the direction of the insertion and that holds the first flange portion, and a second holding portion that is located on an entrance side in the direction of the insertion and that holds the second flange portion,
   at least one of a thickness and a width of the second flange portion is larger than that of the first flange portion, and
   the holding portion includes a projecting portion that allows the first flange portion to enter the first holding portion, and that abuts on the second flange portion to restrict the second flange portion from entering the first holding portion.

2. The electrical connection box according to claim 1, wherein
   the thickness of the second flange portion is larger than the thickness of the first flange portion,
   the projecting portion projects in the thickness direction of the first flange portion and the second flange portion, and is provided in the first holding portion in the direction of the insertion, and
   the projecting portion supports the first flange portion from a side opposite to the conductive member in the thickness direction.

3. The electrical connection box according to claim 1, wherein
   the width of the second flange portion is larger than the width of the first flange portion,
   the projecting portion projects in the width direction of the first flange portion and the second flange portion, and is provided in the first holding portion in the direction of the insertion, and
   the projecting portion pinches the first flange portion in the width direction to hold the first flange portion.

4. The electrical connection box according to claim 1, wherein
   the conductive member includes a first fixing portion to which the first nut is fastened, and a second fixing portion that is parallel to the first fixing portion and to which the second nut is fastened, and
   the conductive member has a curved portion between the first fixing portion and the second fixing portion.

5. The electrical connection box according to claim 2, wherein
   the conductive member includes a first fixing portion to which the first nut is fastened, and a second fixing portion that is parallel to the first fixing portion and to which the second nut is fastened, and
   the conductive member has a curved portion between the first fixing portion and the second fixing portion.

6. The electrical connection box according to claim 3, wherein
   the conductive member includes a first fixing portion to which the first nut is fastened, and a second fixing portion that is parallel to the first fixing portion and to which the second nut is fastened, and
   the conductive member has a curved portion between the first fixing portion and the second fixing portion.

7. The electrical connection box according to claim 1, wherein
   the block includes an electric wire holding portion configured to hold an electric wire led out from an electronic component held by the block, and
   the electric wire holding portion includes a restricting portion that is located between a terminal fastened to the conductive member and the electric wire, and that restricts the terminal from rotating toward the electric wire.

8. The electrical connection box according to claim 2, wherein
   the block includes an electric wire holding portion configured to hold an electric wire led out from an electronic component held by the block, and
   the electric wire holding portion includes a restricting portion that is located between a terminal fastened to the conductive member and the electric wire, and that restricts the terminal from rotating toward the electric wire.

9. The electrical connection box according to claim 3, wherein
   the block includes an electric wire holding portion configured to hold an electric wire led out from an electronic component held by the block, and
   the electric wire holding portion includes a restricting portion that is located between a terminal fastened to the conductive member and the electric wire, and that restricts the terminal from rotating toward the electric wire.

10. The electrical connection box according to claim 4, wherein
   the block includes an electric wire holding portion configured to hold an electric wire led out from an electronic component held by the block, and
   the electric wire holding portion includes a restricting portion that is located between a terminal fastened to the conductive member and the electric wire, and that restricts the terminal from rotating toward the electric wire.

* * * * *